(12) United States Patent
Vohra et al.

(10) Patent No.: US 10,712,467 B2
(45) Date of Patent: Jul. 14, 2020

(54) UNDERGROUND UTILITY LINE DETECTION

(71) Applicant: CABLE DETECTION LIMITED, Stoke-on-Trent, Staffordshire (GB)

(72) Inventors: Anshul Vohra, Stoke-on-Trent (GB); Terence Morley, Stone (GB); Simon Branson, Alton (GB)

(73) Assignee: CABLE DETECTION LIMITED, Cresswell (GB)

( * ) Notice: Subject to any disclaimer, the term of this patent is extended or adjusted under 35 U.S.C. 154(b) by 314 days.

(21) Appl. No.: 15/834,848

(22) Filed: Dec. 7, 2017

(65) Prior Publication Data

US 2018/0172866 A1  Jun. 21, 2018

(51) Int. Cl.
| | |
|---|---|
| *G01V 3/08* | (2006.01) |
| *G01V 3/10* | (2006.01) |
| *G01V 3/12* | (2006.01) |
| *G01V 3/34* | (2006.01) |
| *G01V 13/00* | (2006.01) |

(Continued)

(52) U.S. Cl.
CPC ............ *G01V 3/081* (2013.01); *G01S 13/885* (2013.01); *G01V 3/104* (2013.01); *G01V 3/12* (2013.01); *G01V 3/165* (2013.01); *G01V 3/34* (2013.01); *G01V 3/38* (2013.01); *G01V 13/00* (2013.01)

(58) Field of Classification Search
CPC .......... G01V 3/081; G01V 3/165; G01V 3/38; G01V 3/12; G01V 13/00; G01V 3/34; G01V 3/104; G01V 3/10; G01S 13/885
See application file for complete search history.

(56) References Cited

U.S. PATENT DOCUMENTS

| | | | |
|---|---|---|---|
| 4,438,401 A | | 3/1984 | Iwamoto et al. |
| 5,194,812 A | * | 3/1993 | Yokoi ...................... G01V 3/06 324/326 |

(Continued)

FOREIGN PATENT DOCUMENTS

| | | |
|---|---|---|
| EP | 1 843 177 A1 | 10/2007 |
| EP | 2278358 A1 | 1/2011 |

(Continued)

OTHER PUBLICATIONS

EP Search Report dated Jun. 29, 2017 in Application No. 16206012.3.

*Primary Examiner* — Lee E Rodak
(74) *Attorney, Agent, or Firm* — Maschoff Brennan

(57) ABSTRACT

A mobile detection device for an evaluation of a location information of one or more occluded utility lines. The device comprises at least two magnetic detector units with detection coils for an alternating magnetic field. An electronic signal evaluation unit derives the location information of the utility line according to a difference in the electrical signals from the detector units. A spectral analyzing unit derives a spectral signature of a detected signal and a data link is established to a server, at which an identification of a type or class of one or more utility lines is derived by comparing the spectral signature to a database of signatures of known utility lines. A resulting utility line identification information is provided to the detection device. A visualisation unit of the device charting the one or more utility lines with the utility line location information and providing the utility line identification information.

18 Claims, 6 Drawing Sheets

(51) Int. Cl.
    *G01S 13/88*     (2006.01)
    *G01V 3/38*     (2006.01)
    *G01V 3/165*     (2006.01)

(56) References Cited

U.S. PATENT DOCUMENTS

| | | | | |
|---|---|---|---|---|
| 5,361,029 | A * | 11/1994 | Rider | G01R 31/023 324/326 |
| 7,733,077 | B1 * | 6/2010 | Merewether | G01V 3/104 324/67 |
| 7,741,848 | B1 | 6/2010 | Olsson et al. | |
| 8,248,056 | B1 | 8/2012 | Olsson et al. | |
| 8,547,247 | B1 * | 10/2013 | Haddy | G01V 3/15 340/870.21 |
| 8,635,043 | B1 | 1/2014 | Olsson et al. | |
| 9,116,251 | B1 * | 8/2015 | Haddy | G01V 3/165 |
| 2005/0156600 | A1 | 7/2005 | Olsson et al. | |
| 2013/0002256 | A1 * | 1/2013 | Branson | G01V 3/15 324/326 |
| 2015/0070138 | A1 | 3/2015 | Haddy | |
| 2017/0131422 | A1 * | 5/2017 | Olsson | G01V 3/081 |
| 2017/0363764 | A1 * | 12/2017 | Aldridge | G01V 3/10 |

FOREIGN PATENT DOCUMENTS

| | | | |
|---|---|---|---|
| EP | 2 362 241 | A1 | 8/2011 |
| EP | 2 645 133 | A1 | 10/2013 |
| EP | 3 002 614 | A1 | 4/2016 |

\* cited by examiner

UNDERGROUND UTILITY LINE DETECTION

CROSS-REFERENCE TO RELATED APPLICATIONS

This application claims priority to European Patent Application No. 16206012.3 filed on Dec. 21, 2016. The foregoing patent application are incorporated herein by reference.

FIELD OF THE INVENTION

The present invention relates generally to a mobile detection device according to claim 1 and to a method of detecting underground utility lines

BACKGROUND

It is a common task on construction sites to use devices for detecting underground utility lines, structures, or services before or while earth-moving. Such utility lines are often occurring in form of services for supplying electricity, gas, fuel, water, sewage or communication data, etc. Although the location of most of these utility lines is—or at least should be—already known from a surveyor's plan, their locations can have uncertainties or there could be additional unmentioned utility lines. It is also a problem that there are wide range of sources for getting such surveyor's plans, for example multiple different supply companies, each compiling their own data, probably in a proprietary data format. Often underground utility lines are also simply overlooked or wrongly assessed. Avoidance of damage to underground utility lines while digging in a trench or in areas being excavated is an important task. Damage to a utility line can cause serious impact and costs. Therefore, measures are taken or are even statutory, to detect underground utility lines, preferably evaluating the utility location and/or utility depth of such an underground wiring, conduit or pipe. Devices for this purpose are known as Cable Detection Tools or Cable Avoidance Tools—also called CAT. Such a detection device is mostly embodied movable, preferably designed and built as a handheld device to be carried around by a worker. In special movable embodiment, it can also be mounted at a bucket of an excavator and being move with the bucket.

The classical way to locate underground utility lines is to detect electromagnetic fields sent out by the utility line itself. To do so, the utility line requires having a naturally occurring electrical signal, which emits an electromagnetic field that is detectable above the ground, such as e.g. a live power supply line. Power-lines commonly provide currents with a fundamental frequency of e.g. 50 Hz or 60 Hz, but also harmonics of the fundamental frequencies can be used for detection purposes, in particular zero sequence harmonics. For other services like communication lines, etc. there are also other specific frequency bands which are evaluated by such devices. An embodiment of such a device is for example described in EP 2 362 241. To detect other types of utility lines without naturally occurring signals, for example a wiring system of switched off street lights, unused or low-voltage communication cables, gas- or water-pipes, those can e.g. be directly connected to a signal-generator (e.g. U.S. Pat. No. 4,438,401) or an AC current can be conducted to them via soil (e.g. EP 9 166 139 or EP 2 645 133). In hollow pipes like gas or water pipes, a conductor or a transmitting sonde can be introduced (e.g. U.S. Pat. No. 5,194,812).

The detection itself can be carried out by moving the detection device across a suspected area, e.g. by walking and/or swinging the device side to side. The location where the strongest (or dependent on the setup also weakest) signal occurs can then be marked. A depth value can be determined according to a difference of the detected signals at two detectors which are spaced apart in a known distance in the device. By using more than two detection coils in the device, additional location information can be derived, if the detectors are well calibrated. Therefore, upper-class devices comprise at least two sets of multiple detection coils each. For example, U.S. Pat. No. 8,248,056 shows a detection device with a pair of spaced-apart 3D magnetic sensor arrays and an intermediate pair of sensors for a detection according to tensors-calculations of the picked up field from the utility line.

US 2005/156,600 shows an omnidirectional sonde and line locator having a sensor array including three mutually orthogonal antennas which are sharing a common centre point. To be able to establish such detection, it is mentioned that the coils are calibrated with respect to the other two coils of the same array, which is done by placing the system within a tubular solenoid field in a therefore dedicated calibration camber. U.S. Pat. No. 8,635,043 or EP 1 843 177 are describing such factory calibration rigs, in which an individual fine tuning of each cable detection device can be determined in a factory or laboratory environment.

In U.S. Pat. No. 7,733,077 a portable locator with an articulated antenna node configuration is shown, comprising sets of orthogonally arranged antennas. For finding and mapping buried objects, it uses Doppler-Radar and GPS navigation. It uses a calibration by a large Helmholtz coil which is provided as a dedicated active calibration coil, wherefore a finite element calculation or a special calibration frame setup with multiple small coils in a specific, well defined configuration is suggested. EP 3 002 614 (herewith incorporated by reference) also considers a CAT-Tool calibration.

The detection results can then be presented to the operator, preferably in graphical form by a 2D map-like computer generated graphic showing detected utility lines and their respective depths.

It is common practice to trench multiple different utility lines substantially side by side in close proximity. Thereby the location and identification of a specific utility can get complicated. Also, there can be many uncertainties and influences. Another operator might achieve other detection results, as he uses different approaches, strategies and detection modes, dependent on his skills.

SUMMARY

It is therefore an object of some embodiments of the invention to improve an underground utility detection device, in particular to improve the accuracy and/or reliability of its utility locating capabilities. Avoidance of overlooking some buried utility is also an important object. It is therein also preferred to achieve an identification of a specific utility, which goes beyond the prior art power- or radio-mode distinction.

A particular object is to improve the geographical location accuracy of the detection device. Therein, improvement of the capabilities to geographically locate utilities with respect to surrounding landmarks and/or utility-junctions, utility terminals, etc. is another object. A specific object can therein be to provide the operator with a map-view that is supplemented by up to date metadata.

To generate or update utility-plans and utility databases can be another object, in particular to provide a device and method to supply a specific centralized utility location database with specific real-world information being advantageous for detection purposes.

It's an object to provide such with a multiple axes detection device for buried utility lines, which is built to be self-calibrated, without requiring external equipment or a special setup.

Those objects are achieved by realising the features of the independent claims. Features which further develop the invention in an alternative or advantageous manner are described in the dependent patent claims.

According to some embodiments of the present invention, those objects are solved by providing a device with improved calibration capabilities, in particular by providing a device which is built to achieve a field calibrated multi-dimensional location with utility identification and geographical referencing capabilities and GIS-data interaction.

Some embodiments of the present invention therefore relates to a mobile detection device for an evaluation of a location information from the device to one or more occluded utility lines, which is done according to an alternating magnetic field emanated at the utility lines. For example a location of one or more utility lines which are occluded underground at a construction site.

The device therein comprises at least a top magnetic detector unit and a bottom magnetic detector unit arranged in a defined spacing with respect to each other. Those magnetic detector units comprise detection coils, which are providing an electrical detection signal according to the alternating magnetic field which is picked up by them, in particular according to the picked up alternating magnetic field emanated at the utility line. There can also be a signal conditioning unit for the electrical detection signal, which comprises a broadband current sensing amplifier. For example, such can be embodied by a transimpedance amplifier (TIA) connected to a low winding count detection coil (e.g. with below ten thousand, thousand or less windings), which is built to provide the electrical detection signal with a frequency range of many kHz, preferably with a bandwidth starting at about mains frequency and going up to a range of a few tens or a few hundreds of kHz. The signal conditioning unit can also comprise a frequency filtering and an analog to digital converter. The windings of the detection coils are each enclosing a sensitivity area and can be of arbitrary shape, e.g. round, circular, rectangular and preferably substantially flat, with a height comparably much lower than the outer dimensions of the enclosed area.

The device also comprises a spectral analyzing unit built to derive a spectral signature of the electrical detection signal from at least one of the magnetic detector units. This is not just a simple highpass, lowpass or bandpass filter, but a spectral frequency distribution profile, for example a substantially continuous or quasi-continuous pattern over a broad frequency range.

The device is also provided with a communication interface which is built to establish a data link to a server, at which a matching unit derives an identification of a type or class of the utility line. Identification is done with a comparing of the spectral signature to a database of a plurality of known utility line signatures, whereby matches and potential matches are derived. Preferably not only a straight one-to-one matching is done, but a comparison on typical characteristics which neglects slight deviations and which can also comprise information on a probability of a match, for example by least square calculations, neural networks, etc. The matching can also consider the fact, that the spectral signature can comprise signals from more than one utility line, so that the matching can result in more than one expectation of utilities being present according to the spectral signature, in particular with a quantification of their assumed likeliness.

The identification can be done with accessing one or more centralized databases, wherefore it can preferably be done at least partially by a remote server. The device can then transmit its location information and/or the spectral signature to the remote server, e.g. via wireless data link and/or the internet. At the server, the location information can be refined in resolution, e.g. by RTK-systems or the like. The remote server can access additional utility information at one or more GIS-databases at private or national suppliers, in particular it can harvest and centralize information from a plurality of suppliers in an own database and also combine this information with detection results from a plurality of detection devices. Thereby, a database at the remote server means can be updated and/or supplemented with the actual location information and/or actual spectral signatures from the detection device.

The result of this identification, a utility line identification information, which comprises at least information on the type or class of the utility and can also comprise some map-information, is then provided to the detection device, preferably comprising probability and/or accuracy data of the provided information.

An electronic signal evaluation unit at the detection device is built for detecting the utility line according to the electrical detection signals, from the magnetic detector units, respectively from a signal conditioning unit. The detecting of the utility comprises not only a determination of a putative presence or absence of a utility, but also an evaluating of the utility lines location information with respect to the detection device, according to a difference in the electrical signals at the top magnetic detector unit and the bottom magnetic detector unit. The detecting can therein be at least partially based on the utility line identification information from the server.

The detection device is then comprising or being linked to a local visualisation unit for the operator, which is built for charting the one or more utility lines. This charting comprises the utility line location information and the utility line identification information. Preferably, a graphic mapping of the utility line is provided, e.g. by a display, in augmented or virtual reality, etc.

The units of the device, which are herein described in a separate manner can, at least partially, also be combined into one or more single components, like electronic circuit boards (PCB), microchips, computation units, a digital processor, etc.

Therein, the utility line identification information can comprises signatures of the identified known utility lines, and the electronic signal evaluation unit can derive the location information with a filtering according to those signatures of the identified known utility lines. Preferably a specific filtering of spectral pattern according to those signatures of the identified known utility lines which were provided by the server or which are known typical for the identified type or class of utility lines can be done.

The server can therein be a remote server, with the database being a centralized regional database of utility lines and their geographical locations. The database can therein be updated or supplemented with the derived spectral signature of the electrical detection signal which was detected by the device. The database can in particular be updated with the utility line identification information, the type or class of utility, the location information and/or a geographical location information, date and time of the detection, detection device type, operator, environmental conditions, etc, which can preferably be done interactively with the operator of the detection device, for example comprising a confirmation of the server's information by the device's operator.

The device can also comprise a localization unit built for providing a geographical location information of the device. For example, such can comprise a receiving of navigation-data information from an internal or external navigation system like a GPS, GLONSA, etc. Therein, the matching unit can derive the identification information according to a map- or plan-data of known utility lines in vicinity of the geographical location information of the device. The visualisation unit can then chart the utility lines based on the geographical location information, preferably with providing a graphic mapping of the utility line.

The localization unit can in addition comprise a motion sensor built to establish a motion tracking for a location determination of the device, in particular with an inertial measurement unit (IMU) and/or with a camera built for navigation based on image processing.

The matching by the server can comprise an identification of utility lines, which is done associated with the geographical location and database entries of known utilities, which are passing the geographical location in vicinity, in particular wherein a known utility line path and/or an expected utility line information is provided with the utility line identification information from the server to the device.

At the server, also map data of known utility lines in the vicinity of the geographical location information can be considered. According to this map-data of known utility lines which have to be expected in vicinity of the actual location of the detection device, there can also be an identification of a type or class of the utility line derived. Preferably, the spectral signature and map data can be evaluated in a combined manner, supplementing each other, increasing or decreasing probabilities of certain service types. By the information from the detection device, comprising information on the geographical location and the frequency signature information, an identification of the utility line can be derived. The identification can thereby provide metadata going beyond a class or type of service, but can comprise e.g. information on a track which a utility is running along, joints and connections of the utility, manholes, terminal boxes or valves, owner of the utility, a service hotline contact information, previous detection data of this utility, etc. and other metadata information which is related to the utility.

The utility line identification information can comprise suggestions for applying a transmitter signal to one of the utility lines, in particular comprising information on a technology and/or on a geographical location for applying the transmitter signal.

At least one, in particular each, magnetic detector unit can comprise at least three detection coils in form of windings of an electrically conductive material with their respective axes of the windings, and the location information can then be a multidimensional location information of the utility lines with respect to the device, comprising at least a depth information and a lateral offset information for each of the utility lines.

The electronic signal evaluation unit can comprise a signal conditioning unit for the electrical detection signal with a broadband current sensing amplifier, an analog to digital converter and a configurable selective filter for the deriving of the location information of a specific utility line, in particular a configured selective filter according to the respective utility line identification information from the server, for example according to a known spectral signature of a specific one of the utility lines.

The filtering can also be done based on the type or class which was derived from the spectral signature, but also of other, weaker utilities known or expected to be present, e.g. based on the map data, which can preferably also comprise information on specific expected spectral signature of those expected utilities.

The electronic signal evaluation unit can also comprise a calibration unit, providing a self calibration of the detector units, with a calibration signal generator for applying an electrical calibration signal at one of the detector units. For example, such a self calibration can equalize detection gain and offset for all detection coils of the detection device.

The calibration unit can be built for providing a self calibration of the devices detection coils in the field, comprising a mutual calibration of the detection coils and preferably also of the signal conditioning unit, in particular with respect to a detection characteristic like sensitivity, scaling, phase shift, etc. For doing so, a calibration signal generator can be comprised which is built to selectively apply an electrical calibration signal to the detector units or portions thereof, preferably in form of a defined alternating electrical current which can be supplied to the detection coils.

Some embodiments of the invention also relate to a method of detecting underground utility lines by a mobile detection device which comprises two spaced apart detector units with multiple detection coils, for evaluating a multi-dimensional location information from the detection device to the utility line according to an alternating magnetic field emanated at the utility line. The method comprises a deriving of a spectral signature of an electrical detection signal from at least one of the detection coils, for example by a spectral analyzing unit. The spectral signature can be a substantially continuous spectral frequency distribution over a frequency range of many tens to hundreds of kHz, preferably starting at low frequencies, for example starting at close to zero or below 100 Hz.

By establishing a data link to a server, the server is receiving the spectral signature, and the server is matching the spectral signature to a database which comprises known signatures of a plurality of known utility lines. This matching results in an identifying of a utility line identification information, for example comprising a type or a class of one or more utility lines. The server is then providing this utility line identification information to the detection device. The detection device is deriving a location information of the utility line with respect to the detection device according to a difference in electrical signals from the detector units, which is evaluated.

A charting of one or more of the utility lines is then provided to the operator of the detection device, which comprises the utility line location information and the utility line identification information.

The detection device can therein comprise a localization unit which is providing a geographical location information of the detection device, for example in form of GPS coordinates, which geographical location information is also received by the server. The identifying by the server can then comprise a deriving of the utility line identification information according to a map-data of known utility lines in vicinity of the geographical location information, for example from GIS-databases which can be accessed by the server. The charting can comprise providing a graphic mapping of the utility lines, preferably in local map view of a close vicinity of the detection device's geographical location.

The method can also comprise a calibrating of the detection device with applying an electrical excitation signal to one of the detection coils (which is then acting as a magnetic field transmitter for a calibration field), receiving the calibration field by the remaining of the detection coils which are not acting as transmitter and evaluating the resulting received signals from the remaining detection coils. A repeating of above routine can be done multiple times in permutation, wherein each time another one of the detection coil is acting as transmitter. Based on the results, a determining of calibration parameters for the received signals from the detection coils can be done based on the evaluated calibration field signals from the permutations by a calibration unit, in particular wherein the calibration parameters comprise at least an offset- and gain-calibration parameter. Those calibration parameters can then be applied for the locating of the utility lines.

Some embodiments of the invention also relate to a system comprising a detection device for a multi dimensional utility line locating having a geographical referencing and—as second part of the system—a central server which is providing a database of known utility lines, preferably with spectrum distribution and/or geographical location information, wherein the detection device and the central server are built to establish an online data link and built for carrying out the method as described herein.

The method, or at least those parts of it which involve computation and/or calculation, can also be embodied as one or more computer program products which are stored on a machine readable medium or embodied as electromagnetic wave (such as e.g. a wired or wireless data signal). Consequently, the invention further relates to such a computer program product comprising program code for a utility line detection by a detection device according to the invention. The program code is therein in particular built for executing:
  exchanging data with the detection device, comprising a receiving of a spectral signature from the detection device,
  comparing the spectral signature to a database of signatures of a plurality of known utility lines and identifying at least a type or class of one or more utility lines as utility line identification information,
  providing the utility line identification information to the detection device.

The exchanging of data can comprise a receiving of a geographical location information of the detection device and/or a location information of a detected utility line and the identifying can comprises a deriving of the utility line identification information according to stored map-data of known utility lines in vicinity of the geographical location information.

The computer program can be executed in a detection device according to the invention, which device therefore also involves a computation means built to run a computer program providing the functionality according to the invention, with or without the computer program actually loaded.

BRIEF SUMMARY OF THE DRAWINGS

Devices, methods and setups according to the invention are described or explained in more detail below, purely by way of example, with reference to working examples shown schematically in the drawing. Specifically.

DETAILED DESCRIPTION

The diagrams of the figures should not be considered as being drawn to scale. Where appropriate, the same reference signs are used for the same features or for features with similar functionalities. Different indices to reference signs are used to differentiate between different embodiments of the same or an equivalent feature that is shown exemplary. The term "substantially" is herein used to describe the fact that that a certain value, arrangement or feature does not necessarily need to be 100% exact, but can maybe slightly aberrate, while still being within scope. In other words, there can be some slight deviations, e.g. due to inaccuracies, unintentional, design considerations, tolerances, etc.—but there is a clear tendency towards the mentioned value or arrangement, in particular in view of the technical effect to be achieved therewith. Especially, it is not meant to be an obvious opposite. In any case, besides the meaning of "almost exactly" the term "substantially" can always be interpreted to comprise or also express the meaning of "exactly", or of the particular feature itself.

The herein shown formulas are shown exemplary to explain the basic principle and to show that it is physically and logically possible to achieve a calibration based on the principle according to the present invention. In other embodiments of the present invention, the basic formulas from above can be modified, e.g. to better match the actual physical conditions. For example the magnetic field formulas can be adapted to an actual coil design, the calibration parameters can be chosen differently, parameter estimation, a least square fit, a nonlinear calibration model, etc. can be used to determine the calibration parameters, etc.

Figure 1:
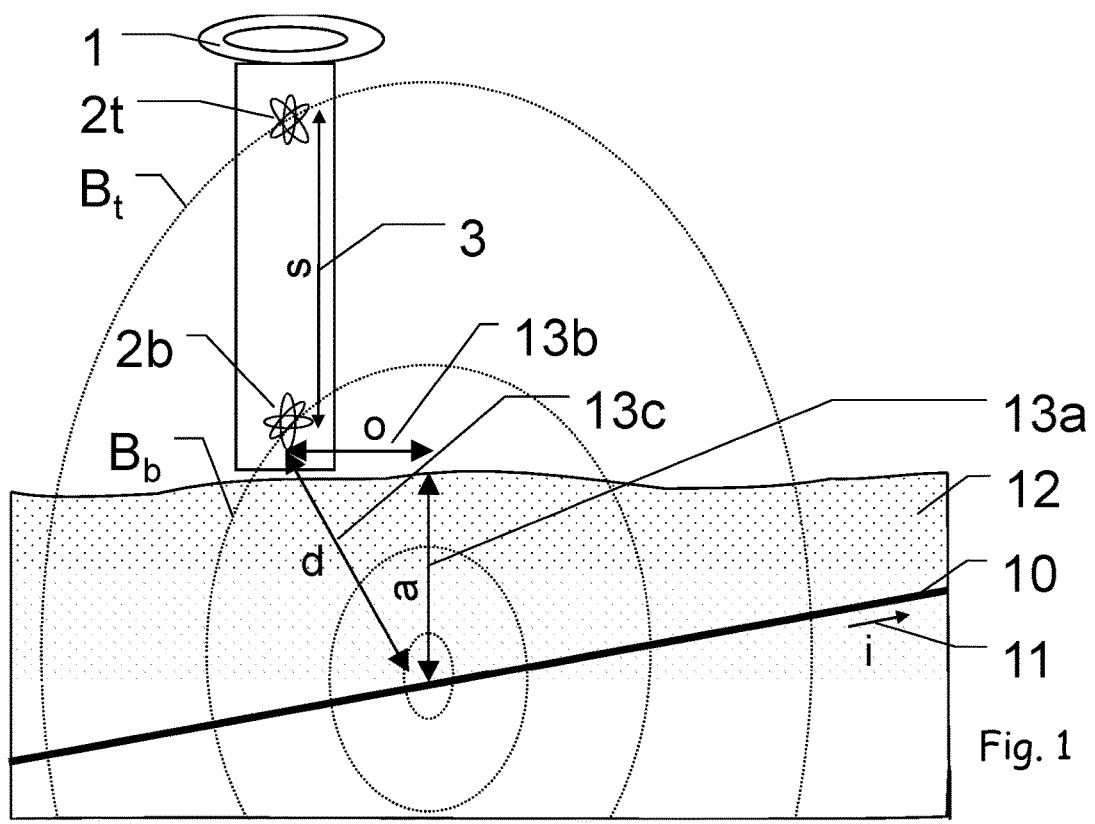
FIG. 1 shows an example of an embodiment of a mobile detection device to which the present document relates.

FIG. 1 shows an embodiment of a mobile detection device 1 for an evaluation of a location information 13 (like e.g. the values of 13a,13b,13c, or other geometrical information) determined from the device 1 to a utility line 10 buried in ground 12, which is carrying "i" as an alternating electrical current 11 and which thereby emanates a magnetic field, symbolically represented by the shown two field lines Bt,Bb. The device 1 comprises at least two detector units with sets of detection coils, as the shown top set of detection coils 2t and the bottom set of detection coils 2*b*, which are arranged with "s" as spacing 3 with respect to each other. The magnetic field emanated from the current 11 in the utility line 10, is illustrated by the magnetic field lines Bt and Bb as an indication of the magnetic field which is detected at the detector units 2*t* and 2*b*.

The detection of the underground service or utility line 10, which can e.g. be an underground cable, sonde, pipe, etc. which is per se carrying the electrical current 11 or to which the electrical current 11 is artificially introduced, is done by detecting the magnetic fields Bt,Bb by the top detector unit 2*t* and the bottom detector unit 2*b*. The buried utility line 10 can therein be considered as a long current carrying conductor, emitting the magnetic field. A distance 13 from a defined point of the device 1 to the buried utility line 10 can then be determined according to the basic formula $$Dist = \frac{s}{\left(\frac{T}{B}\right) - 1},$$

wherein "Dist" is the value "d" of the location information 13*c*, "T" is the magnetic field strengths at the top detector unit 2*t* and "B" at the bottom detector unit 2*b*, and "s" is the separation or spacing 3 of top detector unit 2*a* and bottom detector unit 2*b*.

By multiple axes coil arrangements of the detector units 2*t* and ° 2*b*, also advanced detection techniques can be used, in which certain detection coils or sub-groups of the detection coils are evaluated for certain geometrical characteristics of the to be detected magnetic fields emanated from a buried utility line. Thereby, the location information 13*c* can alternatively be provided with an additionally angle information, e.g. by a value representing a depth 13*a* and a value representing an offset 13*b*, an azimuthal direction of the utility line or other geometrical information concerning the location of the utility line 10 with respect to the device 1.

For example, it can be considered that a detection coil being aligned tangential to the substantially cylindrical magnetic field (or orientated with its axis toward the source of the field) will read a zero field value, whereby a minimum detection can be used to determine location information of the emitting utility line. In another example, a detection coil being aligned perpendicular to the tangential of the substantially cylindrical magnetic field will read maximum when the coil area plane intersects with the emitting utility line, so a maximum detection can be established to determine location information of the emitting utility line. By combining information from more than one detection coil, additional strategies can be chosen to detect such singularities, in particular considering magnetic field symmetries or the like. But also without aligning the device to achieve a specific detection coil orientation, in which such a singularity exists, a general multidimensional location information of the emitting source with respect to the device can be determined numerically. Based on the detected magnetic field values from multiple coils which are aligned differently with respect to each other, a multi dimensional location can be determined, wherefore an example will be discussed further below.

In particular for such a multidimensional detection which is determining a location of the utility line in units of lengths, the pick-up characteristics of the detection coils have to be well known—in particular the field strength sensitivity of the detection coils with respect to each other, but optionally also phase and frequency responses or the like.

Figures 2A, 2B, 2C:
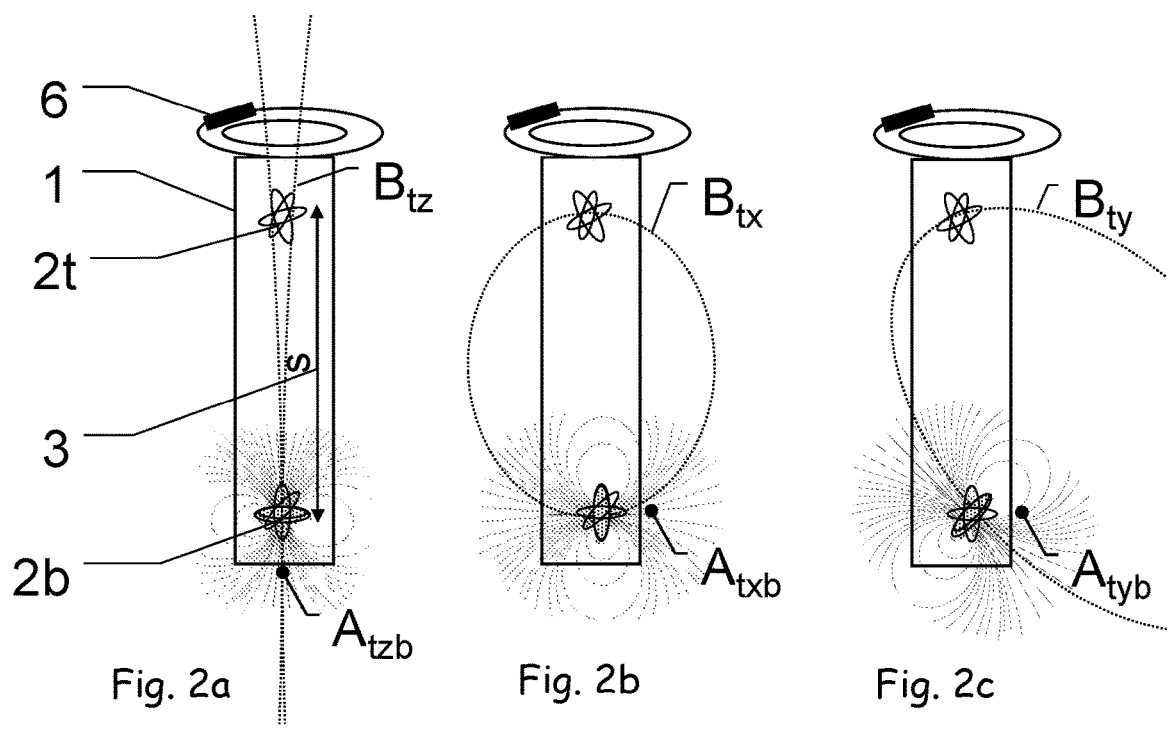
FIG. 2a, FIG. 2b and FIG. 2c are showing an example of a first embodiment of a detection device, describing its calibration according to the invention.

FIG. 2*a*, FIG. 2*b* and FIG. 2*c* are illustrating an embodiment of the principle of an approach according to an aspect of the present invention, according to which a self calibration of the multidimensional detection device 1, for example also in the field—without requiring an external calibration rig, is achieved. Such a self calibration according to an aspect of the present invention, which e.g. can be embodied by a calibration unit providing a special calibration mode or function of the device 1, is explained in the following. The here not explicitly shown calibration unit of the detection device 1 can thereby e.g. also at least partially share the same hardware resources as the evaluation unit 6.

The naming of the detection coils and their respective axes within one of the detector units or sets is kept to be x, y and z, independent of their actual orientation with respect to each other. So the terms x-detection coil, y-detection coil and z-detection coil, does not demand a Cartesian alignment of their detection coil axes with respect to each others, so the naming x, y and z coil does not mean that the coils are necessarily required to be orthogonal with respect to each other or that the axis are necessarily in line with the axes of a global device coordinate system.

In the arrangement shown in FIG. 2*a*, the top detector unit 2*t* is configured in ordinary receiving mode, which is equal to the one used for the above described detection of a buried utility line 10, e.g. the detection coils of the top detector unit 2*t* being connected to an amplifier, filter and/or analog to digital converter.

The role of at least one coil at the bottom detector unit 2*b* is reversed, as it is not used for reception but to transmit a calibration signal, resulting in a magnetic field Atzb. This can e.g. be achieved by applying an electrical excitation signal to the z-detection detection coil (or optionally to a portion of it or to a closely arranged dedicated transmitter) of the bottom set 2*b*, which signal preferably has a known characteristic, such as frequency, current strength and/or phase. To achieve such, the transmitting coil of the bottom detector unit 2*b* can be connected or switched to an electrical signal source, in particular a current source, by the calibration unit. The excitation signal is an ac signal, preferably within a frequency range of the detection device 1 that is also used for the detection of the utility line 10. The excitation signal can for example be a pure sine wave of a known frequency, chosen. For example either with a frequency around mains supply (like e.g. 50 or 60 Hz) or one of its harmonics, and/or around a standard detection frequency as provided by a detection signal injection source that can be applied to a utility line 10 (like about 8 or 33 kHz) and/or around a radio range of e.g. about 15 kHz to 60 kHz. Preferably, the frequency is chosen with a slight offset from naturally occurring signals to achieve signal differentiation to avoid interferences of the calibration signal and a natural signal.

The coils of the top detector unit 2*t* now receive the magnetic field Atzb emitted by the now transmitting bottom detector unit 2*b* and the detected signal can be analyzed and/or stored by the calibration unit, e.g. the signal strength and/or an eventually occurring phase shift can be determined. Due to the embodiment of the coils alignment, which will be discussed below, multiple of the top coils at 2*t* can be configured to receive a portion of the calibration field Atzb and possibly also one or more of the remaining, non-transmitting coils of the bottom detector unit 2*b*, will also receive a portion of the calibration field Atzb.

By the receiving circuitry and electronics, a certain received signal of interest can be selected and the system will hardly be influenced by any outside interference, or noise, wherefore specific frequencies for transmission and reception can be selected, and/or the excitation signal can be specifically coded or modulated and the reception signal accordingly demodulated to differentiate the calibration signal from other external signals. According to the invention, not only the characteristics of the receiving coils, but also those of the whole receiving circuitry and/or signal conditioning unit up to the digitalized values can be determined and calibrated.

As shown in FIG. 2b, in a next step, another coil of the bottom detector unit 2b is configured to transmit a calibration field, by switching an excitation signal to the x-detection coil of the bottom detector unit 2b, configuring it as transmitter for the field Atxb. Again, multiple of the top detector units 2t and/or some of the remaining bottom detector units 2b detection coils are receivers for the field Btxb. The determined values of the field Btx at top respectively of the field Atxb at the bottom are evaluated and/or stored.

As shown in FIG. 2c, in a next step according to this embodiment of the present invention, the next coil of the bottom detector unit 2b, which is in this example the y-coil, can be configured as the transmitter for the field Atyb and again the coils of the top detector unit 2t are receivers, now for the field Bty. The portions of the field Bty determined by each of the coils of the top detector unit 2t can also be evaluated and/or stored. And if the coils of the bottom set are not all arranged perpendicular to each other, also one or more of the bottom detector unit 2b coils which is/are not transmitting can receive and store values received from the calibration field Atyb.

Based on the stored data with respect to the received calibration fields in each step for each of the coils of the top detector unit 2t and bottom detector unit 2b, the calibration unit can self calibrate the detection device 1 by determining calibration parameters for the coils in the top and bottom detector units 2t,2b, by which parameters deviations in offsets and/or gains can be adjusted to zero. Those calibration parameters can then be applied to the field signals of the utility line 10 to be detected during a detection, in order to compensate inaccuracies and to gain good detection results and a correct distance value 13a,13b,13c. In an advanced embodiment of the invention, also geometrical information of the alignment and/or spacing of the top detector unit 2t with respect to the bottom detector unit 2t can be determined based on the stored values.

Figure 3:
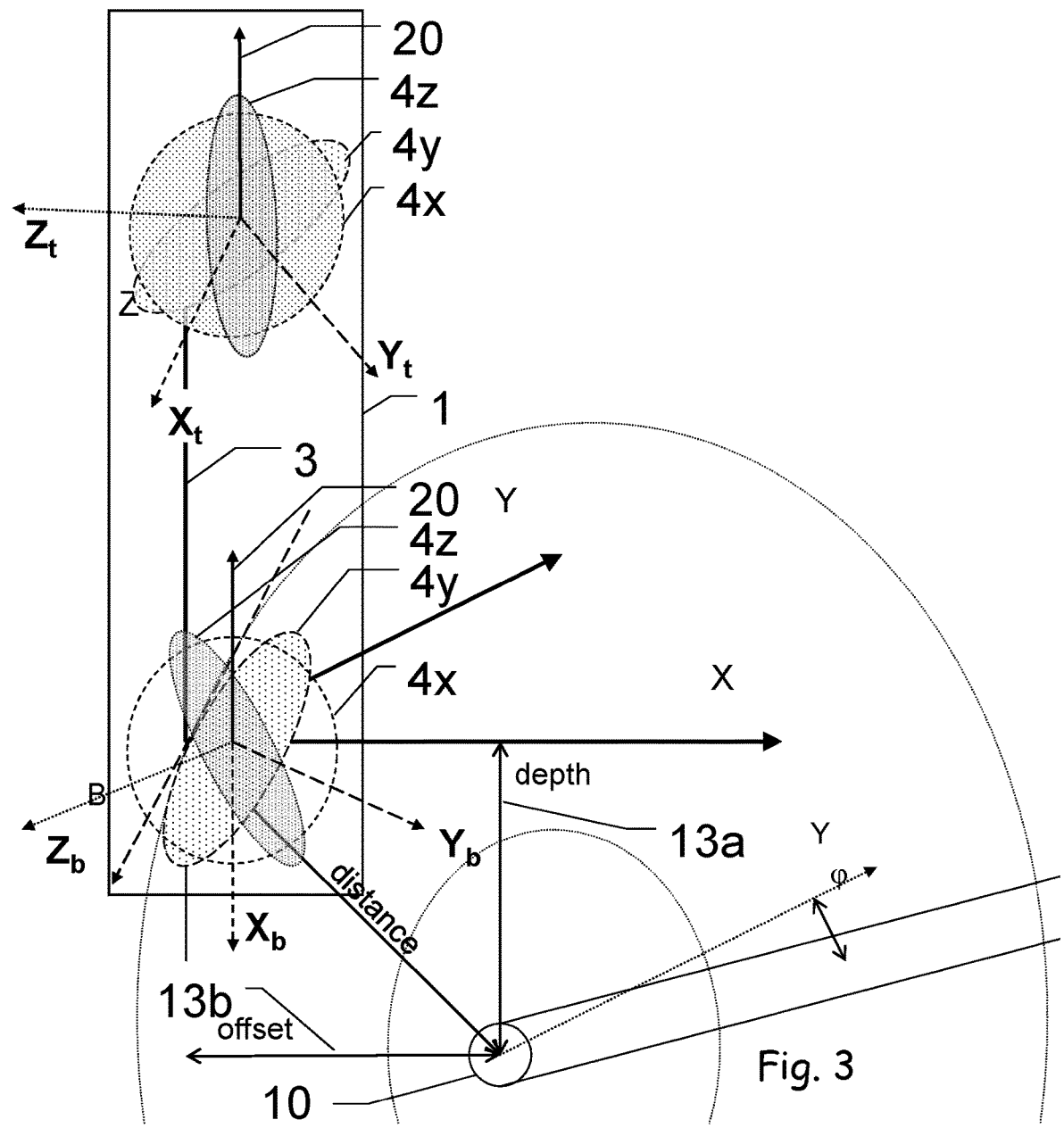
FIG. 3 shows an example of a top and bottom coil set in an embodiment of a detection device, describing a multidimensional location of the invention.

In an illustrative example of an embodiment of the invention in FIG. 3, two sets 2t and 2b of coils, referred to as top detector unit 2t and bottom detector unit 2b, are separated by a distance 3 "s". In an embodiment, all the coils within a set can be assumed to be concentric, which means to share a substantially common centre point, in which the axes of the coils are crossing, and that any offsets are of substantially negligible dimensions. Thereby, an axis through those top and bottom centre point can be defined, which will further be references as device-vertical and is used to define a spacing 3 of the detectors. The detection coils are symbolized by circles with individual fillings. Although not mandatory, in the shown embodiment each of them is substantially perpendicular with respect to the others of the same detector unit. One or both sets 2t,2b can be mounted inclined, with each detection coils at an angle of e.g. as shown about 45 degrees to the vertical direction along the pole.

According to an aspect of the invention, a self calibration of the device 1 is established, by energizing one of the detection coils of one of the sets 2t 2b, which means making it a transmitter, so the other detection coils receive a transmitted magnetic signal from it. By energizing (preferably each of) the detection coils in turn and measuring the resultant signal by the remaining coils, a self calibration of the detection unit of the locator device 1 can be established, in particular by nullifying out offsets and equalizing gains of all of the detection coils.

In prior art the detection device is calibrated by applying an known external field, preferably by using a Helmholtz-Coil to generate electromagnetic fields that emulate those of a long straight cable. According to an aspect of the invention, the nature of the electromagnetic receiving coils is reversible in that a detection coil of one of the sets can be regarded and used as electromagnetic transmitter for calibration purposes. This aspect is in particular based on the finding, that it results to be advantageous for such a calibration that the inherent capability of the detection coil to receive are substantially equal to the characteristics of its ability to transmit. For transmitting, a specific frequency, modulation, amplitude and/or coding can be chosen to differentiate the calibration signal from other influences.

For example, in a first step, the role of the detection coil Xt is reversed and it is forced to transmit a known calibration signal, e.g. by applying an electrical current source to at the ports of the detection coil Xt. The Aerial Xb now receives this signal, which couples with maximum amplitude when both X detection coils are orientated in the same plane. The electronics for signal evaluation during a regular detection is storing the value of the received signal resulting from the field emanated by the applied calibration signal.

Next, the process can be reversed, and detection coil Xb is used as calibration signal transmitter and detection coil Xt is used as the receiver. The resulting value is also stored. If the same results are obtained by both Xb and Xt, then it can be concluded that there are no differences in the response, and therefore in the sensitivity, of the two detection coils. If the results are not the same, then a Null-correction for the X axis detection coils, can be determined as calibration parameter as $$N_x = \frac{X_b}{X_t}.$$

Similarly the process can be repeated for Y and Z giving $$N_y = \frac{Y_b}{Y_t} \text{ and } N_z = \frac{Z_b}{Z_t}.$$

The N-values obtained in the above described calibration process are then used to correct signals from the detection coils to bring them in equilibrium by correcting the field values determined by the corresponding coils and their evaluation hardware and/or software to:

$$X_t \Rightarrow N_x \cdot X_t, \ Y_t \Rightarrow N_x \cdot Y_t \text{ and } Z_t \Rightarrow N_x \cdot Z_t.$$

If the detection coils are arranged ideally orthogonal, an electromagnetic field were, say, aligned with the X axis will not be detected by the Y and Z detection coil, as it will at least theoretically introduce no signal at all in those coils. However, in another embodiment according to the present invention, the arrangement of the detection coils is such that one or more of the detection coils are not orthogonal. If one of the detection coils were to become a transmitter for a calibration field, then a component of its radiated calibration field can then be observed in each of the other aerials. Therefore, at least two of the non-transmitting detection coils will always detect some portion of the transmitted calibration signal.

Using the Xb detection coils now as a calibration signal transmitter, the Top Xt, Yt, Zt, detection coils, of which none is aligned substantially orthogonal to Xb, will all detect a portion of the resultant calibration signal, as well as the Yb and Zb detection coils will, since they are also not aligned substantially orthogonal to Xb. Thereby, not only a ration between Xb and Xt, but also a ratio of the received fields between e.g. the Yt and Yb detection coils and/or other permutations can be determined.

The resulting field strength S, is proportional to the inverse of the cubed distance $d^3$ which can be written as $$S \propto \frac{1}{d^3}.$$

When the separation d of the detection coils is known, a valued for the field ratio can be expected. For example, in case a value for d would be 0.5 m this would give a known field-ratio of 8. Therefore, using the Xb detection coil as a transmitter, the field or signal ratio of Yb/Yt=8 can be expected and a correction for anomalies in the ratio measurement can be determined as calibration parameter. This can be repeated for multiple or preferably all detection coils, giving $$R_y = \frac{knownRatio}{Y_b/Y_t} \quad R_x = \frac{knownRatio}{X_b/X_t} \text{ and } R_z = \frac{knownRatio}{Z_b/Z_t}.$$

To correct for the ratio anomalies during depth calculations, an according correction factors can be determined as calibration factors, giving:

$$Y_b \Rightarrow R_y \cdot Y_b, \; X_b \Rightarrow R_x \cdot X_b \text{ and } Z_b \Rightarrow R_z \cdot Z_b$$

In a particular embodiment of a set of coils, in which not all off the coils are arranged to be substantially perpendicular, it can be considered that even in a multi dimensional detection, the solid angle in which a utility line has to be detected is still limited to a range substantially below the detection device, e.g. within a range of approximately about 30, 45 or 60 degrees around plumb or the like. Therefore, the coil arrangement within the sets can be optimized to this range and e.g. detections in a range substantially perpendicular to an axis between the top and the bottom detector unit can be considered not practically used, wherefore the sensitivity in such directions is not practically relevant and can e.g. be reduced. According to this, the arrangement of the detection coils within the set in a not substantially perpendicular arrangement with respect to each other can be established. Therein also the different detection approaches like maximum detection, minimum detection, etc. as well as an avoidance of ghost fields and the fact that the transmitter can mostly be considered to be infinitively long, can be considered in designing an arrangement.

In a first working embodiment according to the invention, the detection coils in each of the sets are perpendicular with respect to each other, but the different sets are tilted not perpendicular with respect to each other, preferably wherein none of the detection coils of the first set is perpendicular to any coil of the second set.

In a second working embodiment according to the invention, the detection coils in each of the sets are not perpendicular with respect to each other, but the different sets are tilted perpendicular with respect to each other.

In a third working embodiment according to the invention, the detection coils in each of the sets are not perpendicular with respect to each other and the sets are also tilted not perpendicular with respect to each other. In an example of an embodiment, the detection coils can e.g. be arranged at, e.g. 60 degrees to the vertical each.

In a fourth working embodiment according to the invention, the detection coils within both of the sets are perpendicular with respect to each other but the sets are arranged with an offset of e.g. 45° or 60° in multiple axes, in a way that none of the detection coils of the first set is perpendicular to a any coil of the second set.

In a fifth working embodiment, one set comprises detection coils which are perpendicular to each other, while in the other set the coils are not perpendicular to each other and also not perpendicular the ones of the ones of the first mentioned set.

There are pluralities of further embodiments possible for the self calibration, of which the most dominant are:

For the top set 2t and/or the bottom set 2b, all the axes of the detection coils 4 within the same detector unit can be substantially orthogonal to each other.

For the top unit 2t and/or the bottom unit 2b, at least one of the axes of the detection coils 4 within the same set can be non-orthogonal to the other axes of the detection coils 4 of the same set, or all of the axes of the detection coils 4 within the same set can be non-orthogonal to each other.

All of the axes of the detection coils 4 at the top set 2t can be substantially orthogonal to at least one other axis of the detection coil of the bottom set 2b.

At least one of the axes of the detection coils 4 of top set 2t can be nonorthogonal to any axes of the detection coil 4 of the bottom set 2b, or at least two of the axes of the detection coils 4 of top set 2t can be nonorthogonal with respect to any axes of the detection coils 4 of the bottom set 2b.

All of the axes of the detection coils 4 of the top set 2t can be nonorthogonal with respect to any axes of the detection coils 4 of the bottom set 2b.

The axes of the detection coils 4 can be substantially orthogonally within each of the sets, and at least one of the axes of the detection coils 5 of the top set 2t is not substantially orthogonal with respect to the axes of the detection coils 4 of the bottom set.

The axes 4 of the detection coils 4 of the top set 2t can be arranged in a substantially nonorthogonal angle with respect to the axes of the detection coils 4 of the bottom set 2b.

Within the same set, either top or bottom, the coils can be orthogonal to each other, while for the other set at least one detection coil is not.

At least one of the sets comprises a detection coil which is arranged to be held substantially horizontally in the orientation in which the device is held for regular detection, whereby a zero-detection can be established. Another option for a zero-detection by two coils is a vertically symmetric arrangement of tilted coils on each side, in which the difference between the two coils is zero detected.

The term "perpendicular" in the above described working embodiments has to be understood in terms of "substantially perpendicular", which means that minor inaccuracies in the alignment should not be considered to fall out of scope, e.g. deviations of about +/−5 degree or less, in particular if resulting from manufacturing or design inaccuracies. A nonorthogonal arrangement can in principle be of any angle other than 90°, for example, practical embodiment can implement angles of substantially 60° or °45 as preferred values.

As said, a mutual self calibration of the detection coils 4 can be provided by a sequential configuration of at least one winding at the detector units 2t,2b as transmitter for a calibration field Bt,Tt and detecting a resulting calibration field Bt,Tt by the remaining of the detection coils 4 (which are presently not transmitter configured, and determining calibration parameters for the detection coils 4),In an embodiment, the calibration unit 7 can be built to sequentially configure each one of the detection coils 4 of one of the top and bottom sets 2t,2b after the other as transmitter for the calibration field Tt,Bt, while detecting the calibration field Tt,Bt with all of the remaining detection coils of the top and the bottom sets 2t,2b.

Due to the calibration according to the present invention, it is generally not demanded to design all the coils equally, e.g. in terms of their sensitivity, coil area, number of turns, etc. Differing detection coil parameters will be determined by the herein described calibration and are therefore compensable according to the present invention. Depending on the geometrical arrangement, each coil can be designed individually to give best signal quality (e.g. in view of dynamics, SNR, etc.) within its expected range of usage during a regular detection use case. In this consideration, again the different detection strategies like Single Peak, Twin Peak, Null point, Total Field, etc. and the role of this certain coil in this strategy can be involved.

In a special embodiment of a detection or locator device according to the invention, the expected ratio of the field strengths at top and bottom—as resulting from the spacing d—can be considered in the design of the detection coils and/or their corresponding evaluation electronics. For example, during regular operation the always to be expected ration between bottom and top signals can be compensated by different designs of each of the bottom and the top detection coils and/or evaluation electronics, in particular a different amplifier gain, number of turns and/or detection coils area. Thereby, a sensitivity for the top detector can be approximately the expected ration higher than the sensitivity of the bottom one. For example for 5 m depth range and a coil spacing of 0.5 m, the ration is at least R=1.1, whereby the sensitivity of the top coils can be designed by this factor 1.1 times greater than for the bottom coils. Thereby, the received signal level, which has to be evaluated by the following circuit (like filters, AD-Converters, in software, etc.) will be substantially alike in a regular detection for this depth, and both of the detection channels can make use of their full dynamic range.

In the above given case, the mathematical simple version of orthogonal arranged coils was discussed. The same principles apply also non-orthogonal coil arrangement, but a Transformation Matrix comprising the non-orthogonality must be considered for transforming the measurement field measurement values from the coil axis coordinates to the Cartesian device coordinate system. The determined magnetic field values determined by the at least three detection coils can be considered to comprise vector information of the magnetic field. It can also be considered that the geometrical centre point of a coil does not necessarily reflect the point at which the magnetic field has the value measured value. Due to the nonlinear gradient of the field value with respect to the distance, the field integral taken by a large area coil over this gradient does not reflect the field strength a the geometrical centre of the coil—as assumed in simple theory, but at an offset. A tilt of the top with respect to the bottom coordinate system can be considered by including a Rotation-Matrix.

In an example of a fully non orthogonal detection coil setup, it is possible to pickup the following calibration fields at the respective other set, wherein the indices are giving the transmitting set (t/b) and the transmitting detection coil within the set (x/y/z), followed by the receiving set (t/b) and the receiving detection coil within the set (x/y/z):

Btxbx=received signal at top-x from bottom-x,
Btxby=received signal at top-y from bottom-x,
Btxbz=received signal at top-z from bottom-x,
Btybx=received signal at top-x from bottom-y,
Btyby=received signal at top-y from bottom-y,
Btybz=received signal at top-z from bottom-y,
Btzbx=received signal at top-x from bottom-z,
Btzby=received signal at top-y from bottom-z,
Btzbz=received signal at top-z from bottom-z.

In addition at the same set, also the following signals can be picked up for the bottom set:

Bbxby=received signal at top-y from bottom-x,
Bbxbz=received signal at top-z from bottom-x,
Bbybx=received signal at top-x from bottom-y,
Bbybz=received signal at top-z from bottom-y,
Bbzbx=received signal at top-x from bottom-z,
Bbzby=received signal at top-y from bottom-z,
and for the top set:
Btxty=received signal at top-y from bottom-x,
Btxtz=received signal at top-z from bottom-x,
Btytx=received signal at top-x from bottom-y,
Btytz=received signal at top-z from bottom-y,
Btztx=received signal at top-x from bottom-z,
Btzty=received signal at top-y from bottom-z.

For ease of understanding, it is in the following assumed that an equal excitation signal is applied for each transmitting detection coil—which is not a necessarily demanded As shown in the figures, the magnetic field Bt at a distance 3 from the transmitter coil 2a that has a coil radius R, is given by the Biot Savart Law, known from textbooks:

$$B = \frac{\mu_0 i R^2}{4\pi 2 (R^2 + d^3)^{3/2}}$$

To simplify the analysis it is assumed that Area=the cross sectional area of the coil, so that $$B \sim \frac{\mu_0 i Area}{2\pi d^3}.$$

According to the depth-formula, the received signal is proportional to $(1/s)^3$ when the sets are arranged with the spacing by s (which ratio is the same for a field from a utility line during detection), which gives:

$$B_b \sim \left(\frac{Ba}{s}\right)^3, \quad \text{and} \quad B_t \sim \left(\frac{A_b}{s}\right)^3.$$

If everything would be perfect, Ba and Ab would be equal. As this is not the practical case, a calibration value Ks to compensate for any variation in "gain" is introduced. So a calibration of the detection device 1 is achieved by determining a calibration parameter, which makes sensor 2b give the same readings as sensor 2a, such that:

$$Ab = Ba \cdot Ks.$$

If it can be assumed that the locations of the coils 4a,4b with respect to each other can be considered substantially fixed and/or known, their spacing 3 (and the discussed resulting theoretical field-ratio) can also be included in the calculation of the calibration parameters. This can be repeated for multiple or all coils. The nature of the electromagnetic detection coils 4a,4b, for this application can be considered reversible; in that when a coil is configured as electromagnetic transmitter, it can be regarded to have the inherent capability to transmit with substantially equal characteristics as it receives. If the same results are obtained, then it can be concluded that there are no differences in the response and/or sensitivity of the coils of the two detector units 2t and 2b.

The excitation signal can therein be sequentially applied to each one of the coils 4 after the other, while the remaining coils are configured to detect the thereby induced calibration signal. Although possible, it is not required to excite multiple coils with coordinated excitation signals. In a special embodiment, the calibration can also be repeated for multiple excitation signal frequencies to cover a possible non-linear frequency response. In a specific embodiment of the present invention, the detection coils 4 can also be paired with additional dedicated transmission coils for the excitation signal, which are aligned in the same plane and magnetically coaxial to the detection coil, in particular wherein a dedicated calibration winding is directly adjacent to the detection coil, wherein they can be electrically separated or share one of their ports.

Figure 4:
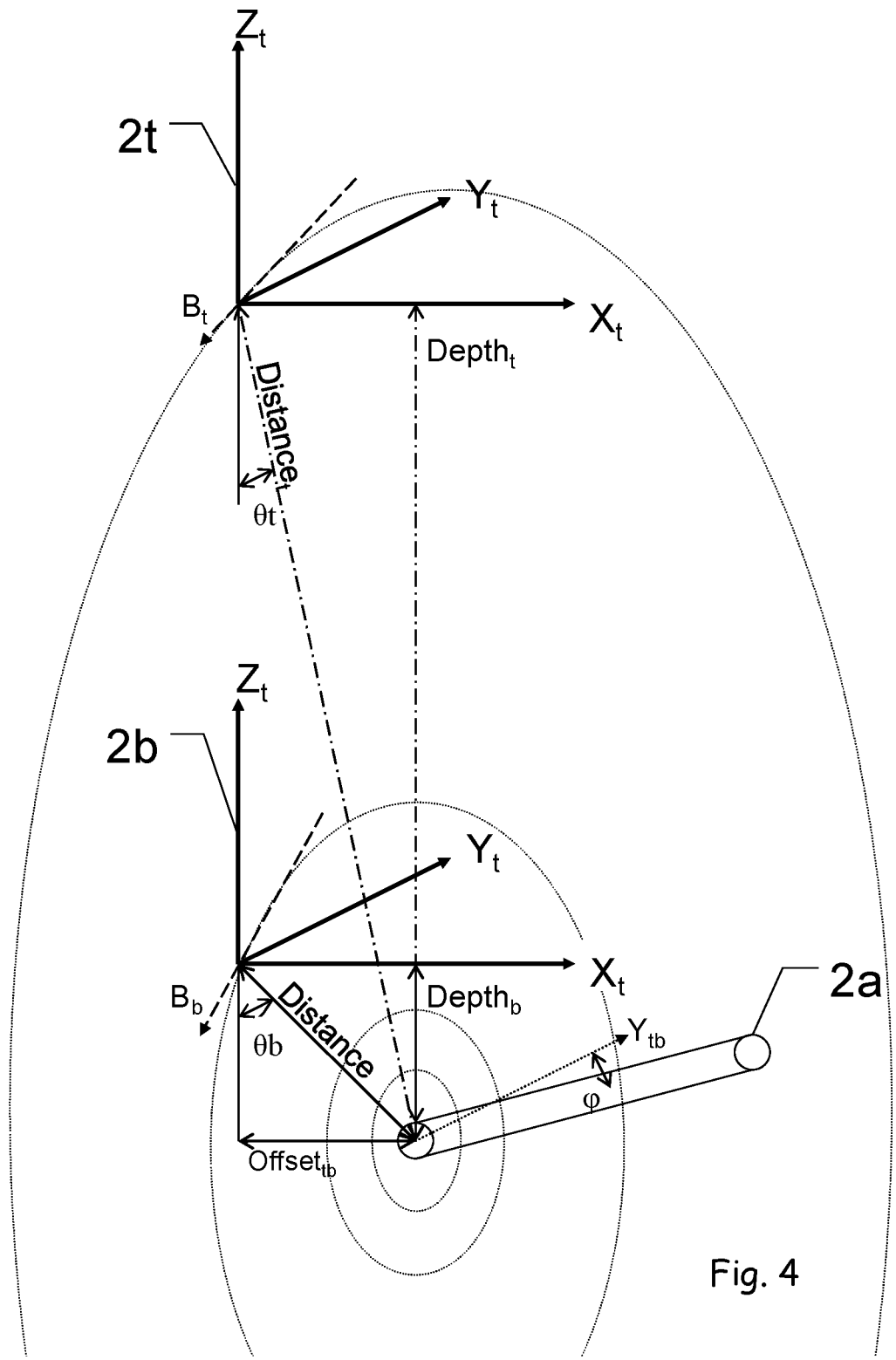
FIG. 4 shows an example illustrating an embodiment of geometrical arrangements in location device according to the present invention.

FIG. 4 shows another example of a detection according to the present invention. It schematically shows a cable locator 1 with two (or more) detector units or sets 2t,2b of tri-axial arrays of detection coils 4x,4y,4z, preferably substantially mutually orthogonal with respect to the other coils in the same set. In contrast to a simple cable locator with just two plain antennas, the special arrangement of the antennas in such an advanced locator 1 can provide a multidimensional representation of the location of a buried cable 10 relative to the locator device 1. In other words, the objective of the cable locator is to give a 3D position of a buried utility, e.g. in z and x coordinates or in an angular coordinate system with distance-radius and angle coordinates.

Such a detection coil winding can for example be embodied with about 90 mm winding diameter, of about 1000 or less turns each, resulting in an inner coil cross-sectional area of about $6.36 \times 10^{-3}$ m2. To keep the self capacitance low enough to use the design at frequencies up to e.g about 200 kHz or more, the windings can be separated, e.g. by splitting the winding over 6 separate sub-coils, e.g. with about 196 windings per section, which can e.g. be realized by 14 rows×14 layers of a 0.112 mm copper enamelled wire (like SWG 41 or AWG 37), wherein a roughly "square" cross sections of the winding segments can be considered as preferable design option. Besides a substantially circular winding, the detection coils can be of square shapes to give larger cores sectional area at the same outer dimensions.

In an example of an embodiment for detecting a 5 m distance from a buried utility line, a cross sectional area as in the example from above, with about $A = \pi \cdot 45$ mm2 is thought necessary. Converting this to a square, the length of each side of the square would be about 80 mm. For a 3D arrangement, starting with a square of 80 mm by 80 mm as the Z axis coil, two other rectangles could be arrange to fit inside this Z square. Preferably, both rectangles can still be designed to have the same area of 6400 mm2. In another example, each coil can have 20 turns of 0.315 mm, SWG30 wire with Area X=Area Y=Area Z=8100 mm2 as illustrated in FIG. 8, wherein the dimensions of the individual detection coils are Z=80 mm×80 mm and X=Y=74 mm×86.5 mm. Regarding the exemplary values mentioned above, those are not to be considered limiting in their exact values, but to indicate a typical order of magnitude in the present field of the art, while the actually desired values can be estimated according to the sensitivity which is required to achieve detection.

The transfer ratio and sensitivity for an embodiment of a detection coil evaluation circuit based on the current sensing model which is discussed below, will in this example evaluate to:

$$I_{out}/B = -(R_f/R_{in}) \times j \cdot 2 \cdot \pi^2 f \cdot n \cdot a^2/R \text{ in } [A/T] \text{ and}$$

$$V_{out}/B = -(R_f/R) \times j \cdot 2 \cdot \pi^2 f \cdot n \cdot a^2 = -j \cdot \pi a \cdot s \cdot f \cdot R_f/\rho \text{ in } [V/T]$$

Therein, the sensitivity is independent of the number of turns n and directly proportional to the area a enclosed by the coil.

Those sets or aerial assemblies 2t,2b, are then arranged one each for Top and Bottom aerials of the detection device 1, each comprising the three pieces of air core detection coils on axes x,y,z at 90 degrees to each other and at 45 degrees to the vertical of the device. An example is illustrated in FIG. 3, which shows the detection coils as (here not explicitly shown) circles 2x,2y,2z drawn with different lines and with the coil area filled by different patterns, which are aligned with the axes of the coordinate system 20.

For a long straight conductor 10 emitting an electromagnetic signal as the utility line to be detected, expressions for the above arrangement will be derived in the following. FIG. 4 shows a 3D coordinate system with the axis x,y,z, where z is vertical to the earths surface and x and y are horizontal to the earths surface. A cable 10 buried underneath the earths surface is emitting an electromagnetic field B, which intersects x,y,z. For a 3D detection the orientation of this field has to be determined. To simplify the observations, it can be assumed that the cable is substantially horizontal to the earth's surface, is infinitely long and has an offset angle φ to the y axis and an angle θ to the z axis as shown.

An expression for the direct distance from the coordinate system to the cable is:

$$dist = \sqrt{depth^2 + offset^2}$$

An expression for the B component of the field in the coordinate system origin, in which an air core detection coil can pick up the B field, is in the x axis:

$$Bx = \frac{B \cos\theta \cos\phi}{dist},$$

in the y axis:

$$By = \frac{B \cos\theta \sin\phi}{dist}$$

and in the z axis:

$$Bz = \frac{B\sin\theta}{dist}.$$

Wherein, in the given simplified example, the Bz formula differs, as in the z plane of a horizontal detection coil, the angle φ has no influence.

In FIG. 4, a setup is shown for two sets 2b,2t of detection coils arranged in a known separation S with respect to each other. Therein, an second set of equations can be determined which also describes the distance and offset angles to the same buried cable 10 with respect to the second top detection coil set 2t. In addition it is known that, the signal strength of the received field, measured at each set is proportional to B/dist. Combining all these factors allows the actual distance and offset to the buried cable 10 to be calculated in three dimensions.

In the shown configuration there are two sets of detection coils which are receiving the electromagnetic signal B from a buried conductor 10. The position of the conductor can e.g. be described as having depth b, relative to the bottom aerial array (e.g. the instrument base) and angle of offset φ relative to the y axis.

Expressions for the distance to the Cable are:

$$Dist_b = \sqrt{Depth_b^2 + Offset^2} \text{ and}$$

$$Dist_t = \sqrt{Depth_t^2 + Offset^2} \text{ and also}$$

$Depth_t = Depth_b + S$, which results in $$Dist_t = \sqrt{(Depth_b + S)^2 + Offset^2}.$$

Considering that the signal strength is inversely proportional to the distance, the ratio R of Bottom and Top field can be defined as:

$$R = \frac{B_b}{B_t} = \frac{Dist_t}{Dist_b},$$

wherein $B_t = Bx_t + By_t + Bz_t$ and $B_b = Bx_b + By_b + Bz_b$.

The ratio R can be measured which also vices the ratio of the distances by $$R = \frac{Dist_t}{Dist_b} = \frac{Bx_b + By_b + Bz_b}{Bx_t + By_t + Bz_t} \text{ and consequently}$$

$$R = \frac{Dist_t}{Dist_b} = \frac{Bx_b + By_b + Bz_b}{Bx_t + By_t + Bz_t} = \frac{\sqrt{Depth_b^2 + Offset^2}}{\sqrt{(Depth_b + S)^2 + Offset^2}}.$$

For the simple case, where Offset=zero, i.e. when the instrument is above the conductor, this gives $$Depth_b = \frac{S}{R-1}.$$

From $Offset = \sqrt{Dist_b^2 - Depth_b^2} = \sqrt{Dist_t^2 - Depth_t^2}$ follows $Dist_b^2 - Depth_b^2 = Dist_t^2 - (Depth_b + S)^2$, giving $$Dist_b^2 = Dist_t^2 + 2S\left(\frac{S}{R-1}\right) - S^2,$$

since when the instrument is above the cable it is also given that $Dist_t = Dist_b + S$.

Using an expression for the Bzb component of the field:

$$Bz_b = \frac{B_b \sin\theta_b}{dist_b} \text{ and } Bz_t = \frac{B_t \sin\theta_t}{dist_t} \text{ gives}$$

$$R = \frac{B_b}{B_t} = \frac{\frac{Bz_b Dist_b}{\sin\theta_b}}{\frac{Bz_t Dist_t}{\sin\theta_t}}, \text{ and } \sin\theta_b = \frac{Offset}{Dist_b} \text{ and}$$

$$\sin\theta_t = \frac{Offset}{Dist_t} \text{ gives } R = \frac{B_b}{B_t} = \frac{\frac{Bz_b Dist_b^2}{Offset}}{\frac{Bz_t Dist_t^2}{Offset}} \text{ and } R = \frac{Bz_b Dist_b^2}{Bz_t Dist_t^2},$$

resulting in $$Dist_t^2 = \frac{Bz_b Dist_b^2}{Bz_t R}.$$

Substituting this in $$Dist_b^2 = Dist_t^2 + 2S\left(\frac{S}{R-1}\right) - S^2 \text{ gives}$$

$$Dist_b^2 = \frac{Bz_b Dist_b^2}{Bz_t R} + 2S\left(\frac{S}{R-1}\right) - S^2$$

for the depth with offset >0, wherein the possible mirror image of the conductor of the quadratic solution has to be considered. For depth with an offset of equal or near zero, this results in $$Depth_b = \frac{S}{R-1}.$$

For the bottom set, the field values can be expressed as:
An expression for the Bxb component of the field is:

$$Bx_b = \frac{B_b \cos\theta_b \cos\phi}{dist_b} \text{ and } Bx_t = \frac{B_t \cos\theta_t \cos\phi}{dist_t}.$$

An expression for the Byb component of the field is:

$$By_b = \frac{B_b \cos\theta_b \sin\phi}{dist_b} \text{ and } By_t = \frac{B_t \cos\theta_t \sin\phi}{dist_t}.$$

An expression for the Bzb component of the field is:

$$Bz_b = \frac{B_b \sin\theta_b}{dist_b} \text{ and } Bz_t = \frac{B_t \sin\theta_t}{dist_t},$$

wherein
for a detection coil array held vertical, φ has no influence for an air core aerial in the z plane for a horizontal aerial.
Similarly expressions for the top aerial array are:
An expression for the Bxt component of the field is:

$$Bx_t = \frac{B_t \cos\theta \cos\phi}{dist_t}.$$

An expression for the Byt component of the field is:

$$By_b = \frac{B_b \cos\theta \sin\phi}{dist_b}.$$

An expression for the Bzt component of the field is:

$$Bz_b = \frac{B_b \sin\theta}{dist_b},$$

wherein
for a detection coil array held vertical, φ has no influence for an air core aerial in the z plane for a horizontal aerial. For above formulas, it is important that each of the detection coils is reliably detecting the correct magnetic field values. Deviation in gain or offset of the detected magnetic field values would result in inaccurate or wrong detection results and depth determinations. Therefore, the self-calibration aspect of the present invention is in particular advantageous.

Figure 5:
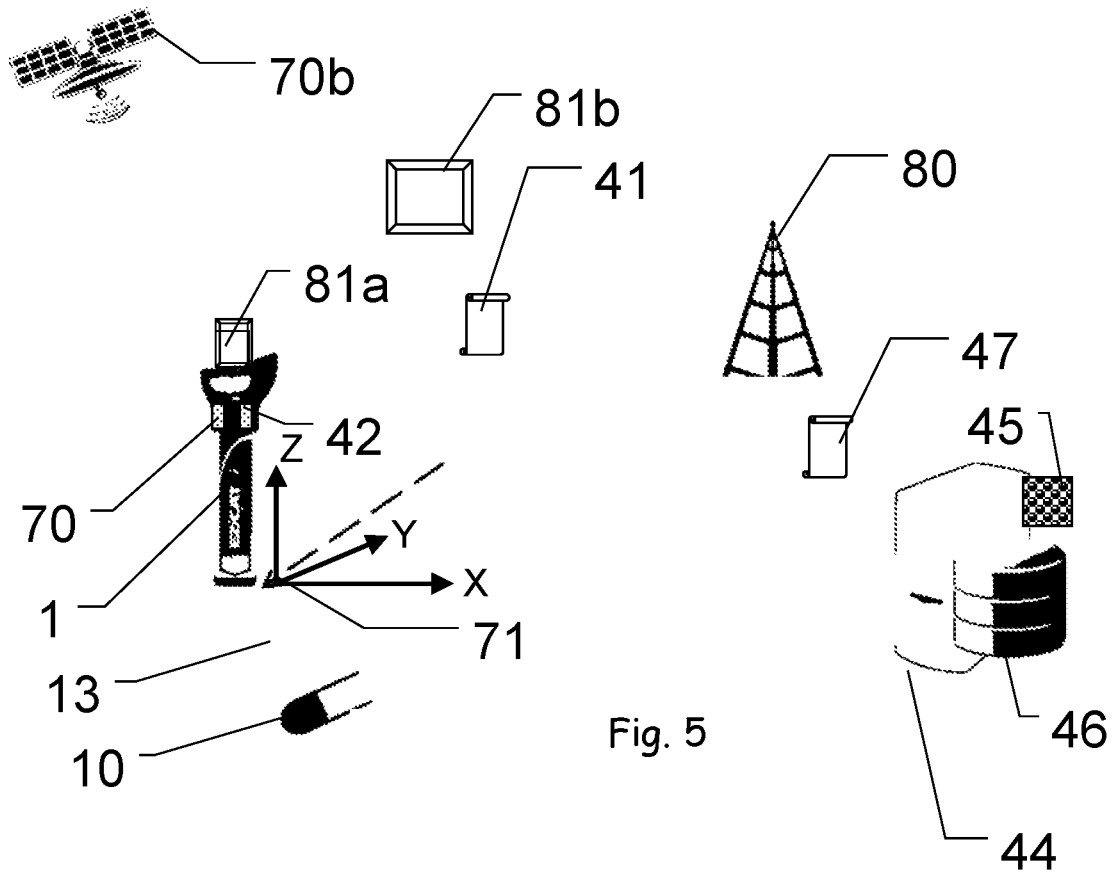
FIG. 5 shows an example of a multidimensional location of a buried utility line according to the invention.

FIG. 5 shows a detecting according to the invention with a detection device 1, comprising at least two detector units 2 as sets of multiple detection coils 4 for detecting a multidimensional location of a buried utility 10, in particular according to one of the embodiments described herein. The device 1 can comprise a GPS-receiver as a localisation unit 70, which can be supplemented with a motion sensor at the device 1. A wireless communication unit 42 at the device 1 provides a data exchange with a remote server 44, for example via Bluetooth, WiFi, radio modem, etc. cellular radio, etc. optionally also via an intermediate gateway device 80. The detection device 1 can provide a visualisation of the detection results via a local or remote graphical display 81.

The utility line 10 can be evaluated based on naturally occurring electrical signals at the utility line 10—without inducing an artificial signals. Beside electrical currents which are present at the utility 10 due to nature or purpose of the utility 10, according to the present invention a detecting due to reradiated frequencies at (also otherwise electrically passive) utility can be established. Such reradiated frequencies can be those resulting from various transmitters within reach to the utility. For example, from various radio transmitters around the globe, in particular those in the low frequency ranges, like various ELF, SLF, ULF or VLF transmitters which are installed worldwide. Their transmitted fields are at least partially picked up by the utility lines 10 or at interface boundary surfaces of varying conductivity or permittivity and are resulting in a reradiating—resulting in a "passive" emission of a characteristic frequency spectrum which can be used for a utility detection according to the present invention. The database according to the present invention can—beside other information—also host information regarding such passive frequency spectrums or spectral signatures, preferably linked to certain locations and/or utility lines 10. The present invention can thereby improve detectability, also—but not only—of such passive utility lines 10. The substantially longish nature of utility lines 10, which are often hundreds of meters to kilometers in length are in particular advantageous for reradiating such frequencies—which then can be advantageously detected according to the present invention.

Therein, known spectrum distributions can be associated to specific signal and/or utility line identities. Preferably, the known spectrum distributions are associated to the geographical area where the detection is done. The comparing can be done at a central server means 44 to which the detection device 1 is establishing a preferably wireless communication link, by which, among others, a transmitting of the geographical location and the frequency spectrum distribution information from the device 1 to the server means 44 respectively a transmitting of map and utility line identification information from the server 44 to the device 1 is established.

The central server 44 can therein gather, harvest and combine map and GIS information from a plurality of utility line providers and can store or link a central database 46 of known spectrum distributions with associated information of the therewith associated utility line identity, e.g. type or kind of the utility line or cable, etc. . . . ). Preferably, the providing of the thereof resulting utility line identification information 47 can be done with a graphical map displayed to an operator of the device 1, in 2D or 3D. The device 1 according to the invention can comprise a user interface which can be provided by local control panel 81a and/or be wired or wireless liked to an attached, detached or detachable control unit 81b, which can for example also be embodied as a smart phone, tablet computer, laptop or similar equipment comprising an input means and an output means which can be operated by a human user. By the communication link, sensed values and control commands can be exchanged between the detection device and the attached smart device, which can run an app for detection measurement, in particular the app can use a combination of information from the inherent sensors of the smart device 81, such as accelerometers, gyroscopes, GPS, cameras, uplinks to the server or to the internet, etc. in combination with data determined by the detection device.

For example, also a camera of a smart device 81 used as control unit can be used for taking pictures or videos for documentation purposes, optical ground tracking, slam-navigation, reading of QR-codes or bar-codes, etc. Since additional sensors, storage, interfaces, communication links internal computation power, communication interfaces, user interface, screen, touch screen, etc. can thereby be at least partially externalized, the detection device can be embodied lightweight.

The central server 44 can therein also update a mapping information for the utility line 10 in a database 46, based on the geographical location 71 of the device 1 and the location 13 determined by the detection device 1. Preferably, the operator of the detection device 1 can provide a confirmation of the utility line map and/or utility line identity provided by the server 44, based on local conditions. Therein, the server 44 can execute a self learning algorithm based on the confirmation for improving detection reliability and the known spectral information in the database 46. In particular, the detection device can capture additional metadata with respect to the utility line and it's detection from the device's operator which can then be supplemented in the database 46.

A proximity-sensor at the underside of the device 1 can measure a spacing from ground level, which can be used as an offset for providing an actual sub-surface depth. A tilt sensor can be used to determine the orientation of the detection device 1 with respect to level, e.g. to reference a coordinate system of the measurement data. A compass can be used to determine the azimuthal orientation of the device 1 and/or the detected utility lines 10.

An embodiment of the invention can be described to relate to a method for locating an underground utility line by a detection device 1 with a detecting values of a magnetic field from the utility line 10 by at least two spaced apart detector units and a sampling of those values in a broadband range, for example of low frequencies starting from close to zero to e.g. about 33 kHz, 250 kHz or more. Base on the values of the magnetic field, a determining of position of the utility line 10 with respect to the device 1 is done and a mapping the position of the utility line to a geographical location 71 of the detection device 1 is established. The geographical location 71 can therein for example be based on data from a surveying instrument or a navigation satellite system like GPS.

According to the invention, an obtaining of a spectral frequency distribution profile or spectral signature 41 from the values of the magnetic field from the utility line 10 is established, preferably a substantially quasi-continuous spectral frequency distribution profile within a broadband range. Then, there is a comparing of the spectral frequency distribution profile 41 with a plurality of known spectral distributions from a database 46, by a server 44, whereby identification information of one or more utility lines 10 is established. Preferably, the identification information is also established based on a geographical location 71 of the detection device 1 and known utility lines 10 in vicinity of the geographical location 71 from the database 46. The server 44 can be remote from the detection device 1 and the two can exchange data via a wireless communication link. The database 46 can be centralized for certain geographical regions, or automatically centrally collected from a plurality of specific databases. Such known spectrum distributions can be based on previous detections of utility lines 10 and/or on a known kind or usage of a known utility line 10. For example, such a comparing or matching can comprising determining expected utility lines 10 at the provided location and position, which expected utility lines 10 can be determined by GIS-database lookups and filtering of the frequency spectra of utility line types in a geographical proximity, in advance of the matching. It can also comprise providing information about undetected utility lines 10 in vicinity derived from the database 46, for example non-current carrying-utilities such as optical cables, etc. Estimating a kind/type of utility line can be done by comparing the spectral frequency distribution profile 41 with information from a database 46 of known spectral profiles of known utility lines within the proximity of the geographical location 71.

Such an access to the database 46 can also involve synchronizing information about the geographical location 71 and its proximity in a database of utility lines and their respective metadata, in particular comprising their actually derived spectral profile information. Therein, updating of the database 46 of existing entries and/or supplementing the database with new entries can be done, for example not only for this specific location 71 but also for all the locations along which the same utility line 10 is running along. A database lookup can involve online obtaining map information relevant for the geographical location 71 and its proximity from a geographical information system (GIS)-server, preferably with establishing a Real Time Kinematics (RTK)-correction of the location information.

The matching or comparing results in determining one or more best fits of estimated utility lines 10, which are provided in the identification information 47, preferably comprising metadata associated with the known spectrum distribution and/or geographical location from the database 46, etc. Such can e.g. be information about utility lines 10 which should be present and should be detected at the devices location 71. For example, those can also be used as relative local spatial references. It can also comprise information on utility lines 10 which probably need to be supplied with a transmitter signal, preferably with a suggestion of a location and/or technique for applying the transmitter to the utility line.

In other words, an embodiment of the invention can pertain to a detecting of occluded utility lines 10 according to a magnetic field emitted from them, with determining a spectral frequency distribution profile of the fields, a location information with respect to the detection device, and a geographical location 71 by referencing the location information to surveying data. It can further involve providing the determined spectral frequency distribution profile or signature 41 and the according determined geographical location 71 of the detecting to a remote server 44 by a wireless data link. There, a gathering of geographical map information and information with respect to putative utility lines in proximity of the geographical location 71 is done, in particular involving online database-lookups. Also, a comparing of the determined frequency distribution profile with known frequency spectrums of specific types of utility lines 10 from a database 46, and/or a comparing of the frequency distribution profile 41 to specific pre-stored frequency spectrum information of the putative utility lines 10 in the proximity of the geographical location 71 is done for identifying one or more of the putative utility line types from the frequency distribution profile 14, in particular by matching the putative utility lines 10 and the identified utility line types. By the wireless data link, the remote server 44 can provide the location device 1 with geographical map information, comprising the identified utility line types and the putative utility lines 10, which can then be displayed by the detection device 1.

Figures 6A, 6B, 6C:
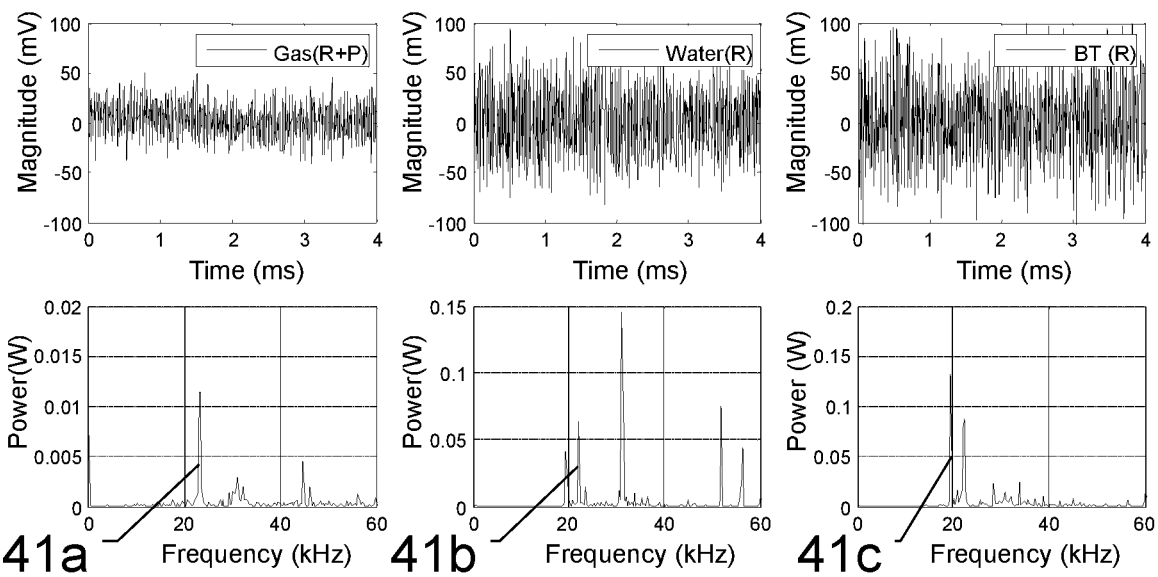
FIG. 6a, FIG. 6b and FIG. 6c are showing examples of illustrations of a spectral patterns according to the invention.

FIG. 6a shows an example of an illustration of a spectral signature or pattern 41a according to the present invention. This can be an illustration of a spectral signature 41 as derived by the spectral analyzing unit 40. It can also illustrate a signature of a known utility line 10 in the database (46). Apparently, the data format of the spectral signature can and likely will be different from the shown, human readable graphical illustration, e.g. a numerical data sequence. The spectral signature can also be more abstracted, e.g. only defining main characteristics, dominant frequencies, relative proportions, etc. This example is showing an example of a buried gas-pipe detected at a specific geographical location in central UK. The upper diagram shows a signal time diagram, while the lower is showing a frequency spectrum, which shows certain specific particularities, which can for example be used as characteristics for the comparing and matching.

FIG. 6*b* shows another example of an illustration of a spectral signature 41*b* similar to the one of FIG. 6*a*, but for a buried water pipe at about the same geographical location. It can be seen that the frequency signature is different, and that this difference can be used for differentiating and identifying a utility to either be a gas or water pipe. Even if the exact shape of the signature varies, obvious principle characteristics can be used for identifying.

FIG. 6*c* shows another example of an illustration of a spectral signature 41*c* as in the figures before, this time of an underground telecommunication line.

Figure 7:
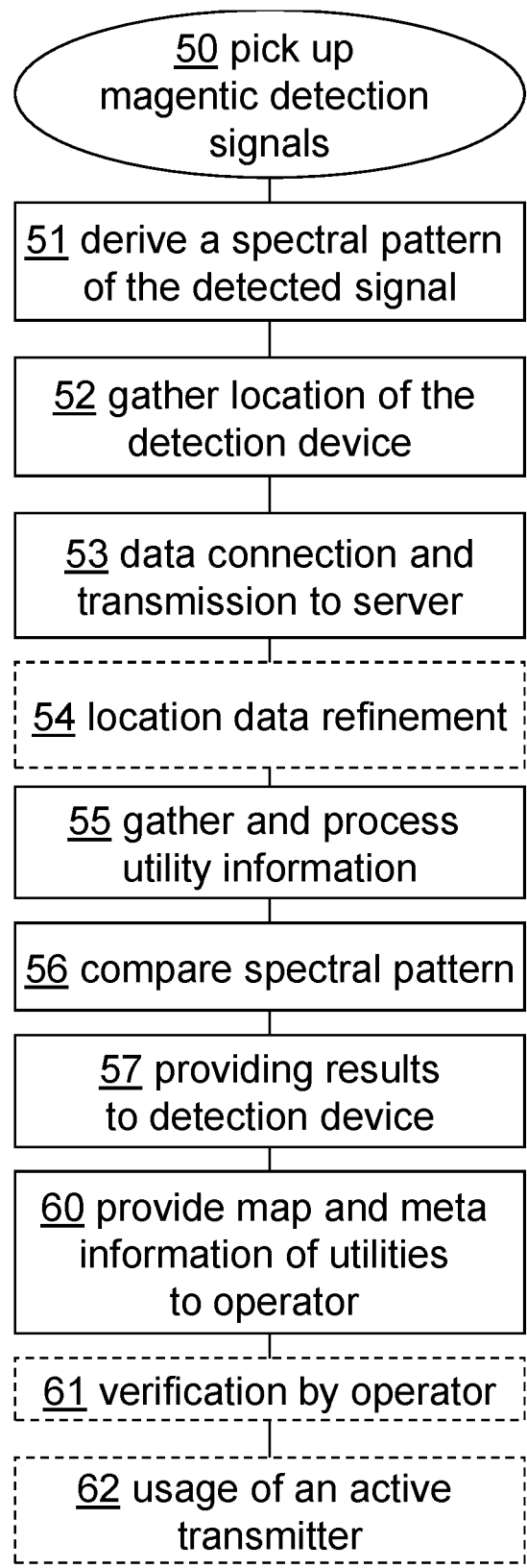
FIG. 7 shows an example of a block diagram illustrating the principle of a self calibration of a detection device according to the invention.

An embodiment of a detecting according to the invention can therein comprise the steps as shown in the example of a basic block diagram of FIG. 7.

In block 50, the detector device processes the electromagnetic signals that are (re-)radiated from buried utilities in order to accurately determine the relative position of the buried utility, x, y, z.

In block 51, the signals are also processed to obtain a frequency spectrum as spectral signature, which can e.g. comprises a set of data points giving the frequencies and relative amplitudes of the main frequency bands contained in the spectrum.

In block 52, the geographical location of the detection device is determined, for example from the GPS data.

In block 53, a wireless (or optionally also hardwired) data connection is established, allowing a connection and a data transfer to a remote server, e.g. via the internet, according to a known hostname or IP address or the like. By this data-link, the location information and the spectral signature of the buried service is transmitted to the remote Server.

In block 54, the location information of the detection device can optionally be corrected and/or improved in accuracy, e.g. from meters to centimeters, e.g. by using commercial Real Time Kinematics, motion tracking, image processing, or the like.

In block 55, a matching unit at the server, e.g. running therefore designed software, uses the location information to obtain all relevant maps available from utility companies, governmental resources, cable detection companies, Geospatial Information Systems (GIS), etc. by remotely contacting respective web sites or databases to gather utility information. The server can also comprise an own database of utility information, which can harvest and/or cache relevant utility information. The resulting information and maps are then processed by the software running on the server. For example, a condensing and minimizing of the information to a local area around the location of the detection device ant to the utilities known to be in vicinity can be established.

In block 56, the matching unit, preferably comprising software running on the server, takes the frequency spectrum information from the spectral pattern and compares it with many frequency spectrums in the database to obtain on or more best fits for example by pattern recognition techniques and/or probability calculus. This technique allows the utility to be identified with a certain probability. As the data base grows, the probability of identifying the utility can be increased and in particular, a self-learning process can be established. Other attributes of the buried service can also be stored in the database as additional metadata or attributes of the utilities and these can also be analysed. The database can also be updated by the actually derived data from the detection device, and this data can be used in the future as required.

In block 57, the results of the analysis, the service identification, a simplified local map or the like can then be transmitted back from the server to the detection device.

In block 60, the local simplified map is displayed on a Display at the detection device, for example showing the location and orientation of the buried utilities, their identity (e.g. Electricity Cable, Telecoms, Gas, Water, etc.), their depth, etc. The displayed map can be moved dynamically on the display relative to the position of the detection device, e.g. as derived by GPS, Motion Sensors, SLAM, optical surveying image processing, etc.

In block 61, optionally a verification that the identified utilities agree with the map can be made by the operator then confirmation transmitted back to the server and/or to the facility which originally supplied the utility information.

In block 62, optionally, the server may provide suggestions for cases where a transmitter should be applied to an otherwise not detected utility line. Using a signal transmitter device coupling an artificial signal to the service at some remote point from the location of the detection device. In a specific embodiment, the detection device can remotely control such a detection signal transmitter via a wireless connection, e.g. by Bluetooth, zigbee or the like. The transmitted signal which couples to the service can thereby be swept through a frequency range, from a few 10 Hz to a few hundred thousand Hz (say 100 Hz to 200 kHz) and the resulting frequency spectrum at the detection device can be determined. The conductive properties and characteristics of the buried service can thereby be determined, as by nature of the utility's construction some frequencies are more easily transmitted than others—which leads to a specific active frequency spectrum.

Figure 8A:
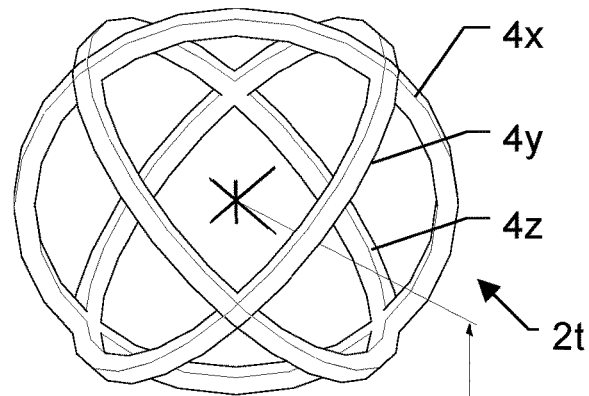
FIG. 8a and FIG. 8b are showing examples of embodiments of sets of detection coils for a calibration according to the invention.
Figure 8A:
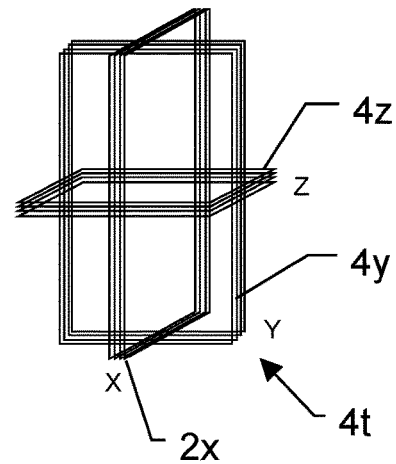
Figure 8A:
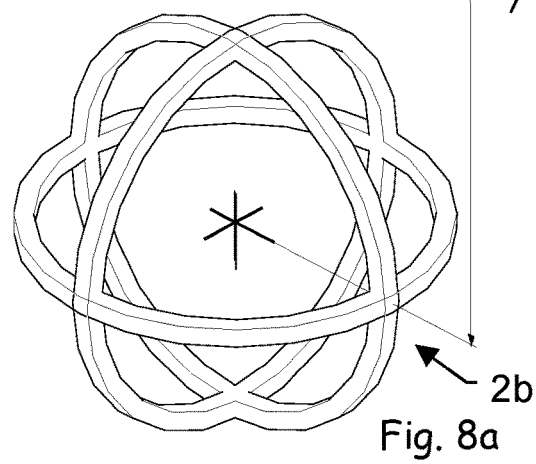

FIG. 8*a* shows an example of an embodiment of a setup of two multidimensional detector units 2, each with three substantially circular wire-wound detection coils 4 that are arranges substantially perpendicular with respect to each other. In particular in view of the calibration discussed above, the shown embodiment has one of the detector units arranged tilted with respect to each other, such that a calibration field emitted from one of the coils at a first of the detector units induces a signal all three coils of a second of the detector units 2.

Figure 8B:
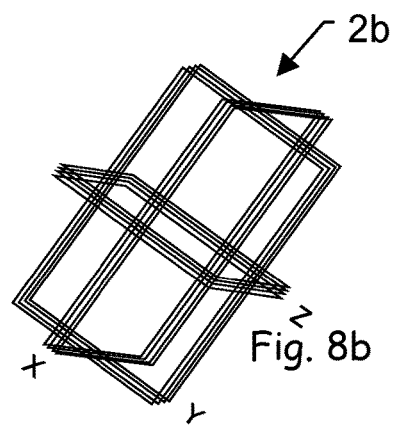

FIG. 8*b* shows a similar example of an embodiment as in FIG. 8*a*, but with substantially rectangular shaped detection coils, nested within each other, but preferably having substantially the same sensitivity area size.

Figure 9:
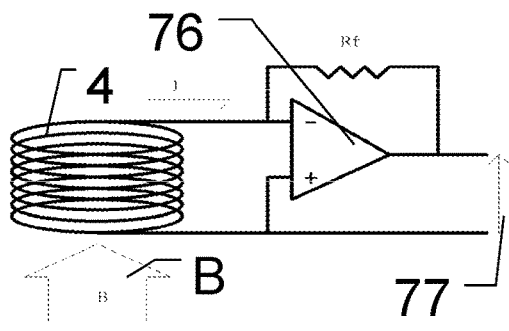
FIG. 9 shows another example of an embodiment of a current sensing amplifier according to the invention.

FIG. 9 shows an example of an embodiment of a current sensing amplifier stage connected to the detection coil. The broadband electronic signal evaluation unit can preferably comprise such an amplifier circuit embodied as a current sensing amplifier 76 as a first amplification stage which is connected to the detection coil 4, in particular embodied as a transimpedance amplifier, preferably having a low input impedance, for example below 100 Ohm. Such an amplifier circuit can be built to be tuned to have a substantially linear output over frequency in combination with the coil 4. For example, the current sensing amplifier 76 can comprise an operational amplifier OpAmp with a feedback network in a current to voltage configuration, in particular wherein:

the negative OpAmp input is connected to one end of the coil 4 and the other end of the coil 4 is connected to the positive OpAmp input and the OpAmp output is fed back to the negative OpAmp input by a first (e.g. resistive and capacitive) impedance.

A detection coils 4 can for example be embodied as having each a winding count of 1 to 500 turns of a conductor with a cross-section of at least 0.1 mm2, in particular wherein the winding of the detection coil 4 encloses an area of more than 100 cm2 and below 0.5 m2, preferably with a approximately rectangular or circular cross-section. The axes of the detection coils 4 of the top set 2*t* and/or the bottom set 2*b* can also be arranged to share a substantially common centre point within the set. The windings of the coils can be aligned mutually non-coinciding within the detector unit 2*t*,2*b*.

Figure 10:
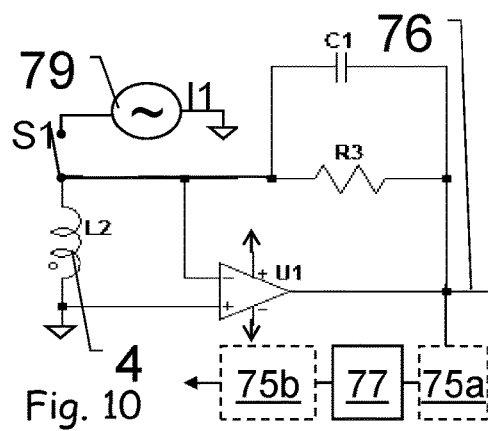
FIG. 10 shows an example of an embodiment of a calibration according to the invention.

FIG. 10 shows an example of an embodiment of the current sensing amplifier 77 in combination with the self calibration aspect described above, where a calibration signal generator 79 can be switched to the detection coil 4 for calibration of the detection device 1. There is also an analog-to-digital converter 77, as well a (preferably configurable) filtering 77 shown. The filtering is shown as an analog filter 77*a* and/or a digital filter 77*b*.

A skilled person is aware of the fact that details, which are here shown and explained with respect to different embodiments, can also be combined with details from other embodiments and other permutations in sense of the invention.

What is claimed is:

1. A mobile detection device for an evaluation of a location information from the device to one or more occluded utility lines according to an alternating magnetic field emanated at the utility lines, the mobile detection device comprising:
   at least two magnetic detector units arranged in a defined spacing with respect to each other, which are comprising detection coils for providing an electrical detection signal according to the alternating magnetic field;
   a spectral analyzing unit built to derive a spectral signature of the electrical detection signal from at least one of the detector units;
   a communication interface configured to transmit the spectral signature by a data link to a server, at which server a matching unit derives an identification of a type or class of one or more utility lines by comparing the spectral signature to a database of signatures of a plurality of known utility lines and generating a utility line identification information, and configured to receive the utility line identification information from the server;
   an electronic signal evaluation unit built for deriving the location information according to a difference in the electrical signals from the at least two magnetic detector units; and
   a visualisation unit built for charting the one or more utility lines with the utility line location information and providing the utility line identification information,
   wherein the electronic signal evaluation unit comprises a calibration unit providing a self-calibration of the detector units, with a calibration signal generator for applying an electrical calibration signal at one of the detector units or portions thereof.

2. The mobile detection device according to claim 1, wherein the utility line identification information comprises signatures of the identified known utility lines, and the electronic signal evaluation unit is deriving the location information based on the utility line identification information.

3. The mobile detection device according to claim 2, wherein the electronic signal evaluation unit is deriving the location information with a filtering of the broadband electrical detection signal, which filtering is done according to those known frequency signatures of the identified known utility lines.

4. The mobile detection device according to claim 1, wherein the server is a remote server, with the database being a centralized regional database of known utility lines.

5. The mobile detection device according to claim 1, the device comprises a localization unit built for providing a geographical location information of the detection device, and the matching unit derives the identification information according to a map-data of known utility lines in vicinity of the geographical location information, and the visualisation unit is charting the utility lines based on the geographical location information with providing a graphic mapping of the utility line.

6. The mobile detection device according to claim 5, wherein the localization unit comprises a motion sensor built to establish a motion tracking for a location determination of the device with an inertial measurement unit (IMU) or with a camera built for navigation based on image processing.

7. The mobile detection device according to anyone of claim 5, wherein the matching by the server comprises an identification of utility lines which is done associated with the geographical location and database entries of known utilities passing the geographical location in vicinity, wherein a known utility line path or an expected utility line information is provided with the utility line identification information.

8. The mobile detection device according to claim 1, wherein the database is updated with the derived spectral signature of the electrical detection signal, with the utility line identification information, the type or class of utility, the location information and/or a geographical location information.

9. The mobile detection device according to claim 1, wherein at least one magnetic detector unit comprises at least three detection coils in form of windings of an electrically conductive material, and the location information is a multidimensional location information of the utility lines with respect to the device, comprising at least a depth information and a lateral offset information.

10. The mobile detection device according to claim 1, wherein the electronic signal evaluation unit comprises a signal conditioning unit for the electrical detection signal with a broadband current sensing amplifier, an analog to digital converter and a configurable selective filter for the deriving of the location information of a specific utility line, according to the respective utility line identification information and the known spectral signature of the specific utility line.

11. A detection system for an evaluation of a location information of one or more occluded utility lines, comprising a detection device according to claim 1 and a server comprising the database.

12. The mobile detection device according to claim 1, wherein the utility line identification information comprises suggestions for applying a transmitter signal to one of the utility lines, comprising information on a geographical location indication for applying the transmitter signal.

13. The mobile detection device according to claim 1, wherein the database of known utility lines comprises their respective geographical locations and their known frequency signatures.

14. A method of detecting underground utility lines by a mobile detection device which comprises two spaced apart detector units with multiple detection coils, for evaluating a multidimensional location information from the detection device to the utility line according to an alternating magnetic field emanated at the utility line, with a routine comprising:

deriving a spectral signature of an electrical detection signal from at least one of the detection coils;

establishing a data link to a server, wherein the server is receiving the spectral signature, matching the spectral signature to a database of signatures of a plurality of known utility lines, identifying a type or class of one or more utility lines and providing a utility line identification information to the detection device;

deriving a location information of the utility according to a difference in electrical signals from the detector units; and charting one or more of the utility lines with the utility line location information and providing the utility line identification information, wherein:

a calibrating of the detection device is done with:

applying an electrical excitation signal to one of the detection coils, which is then acting as a magnetic field transmitter for a calibration field, receiving the calibration field by the remaining of the detection coils which are not acting as transmitter and evaluating the resulting received signals from the remaining detection coils;

with repeating above routine multiple times in permutation, wherein each time another one of the detection coil is acting as transmitter; and determining calibration parameters for the received signals from the detection coils based on the evaluated calibration field signals from the permutations by a calibration unit.

15. The method according to preceding claim 14, wherein a localization unit is providing a geographical location information of the detection device, which the server is receiving, and the identifying by the server comprises a deriving of the utility line identification information according to a map-data of known utility lines in vicinity of the geographical location information, and the charting comprises providing a graphic mapping of the utility lines.

16. A computer program product comprising program code stored on a non-transitory machine-readable medium for improving a detecting of buried utility lines by a detection device, the computed program product configured for executing:

exchanging data with the detection device, comprising a receiving of a spectral signature from the detection device;

calibrating of the detection device with:

applying an electrical excitation signal to one of the detection coils, which is then acting as a magnetic field transmitter for a calibration field, receiving the calibration field by the remaining of the detection coils which are not acting as transmitter and evaluating the resulting received signals from the remaining detection coils;

with repeating above routine multiple times in permutation, wherein each time another one of the detection coil is acting as transmitter; and determining calibration parameters for the received signals from the detection coils based on the evaluated calibration field signals from the permutations by a calibration unit, comparing the spectral signature to a database of signatures of a plurality of known utility lines and identifying at least a type or class of one or more utility lines as utility line identification information; and providing the utility line identification information to the detection device.

17. A mobile detection device for an evaluation of a utility line identification information and a utility line location information from the device to one or more occluded utility lines according to a spectral frequency distribution profile of an alternating magnetic field emanated at the utility lines, comprising:

at least two magnetic detector units arranged in a defined spacing with respect to each other, which are comprising detection coils for providing a broadband electrical detection signal according to the alternating magnetic field;

a spectral analyzing unit built to derive the spectral frequency distribution profile of the broadband electrical detection signal from at least one of the detector units;

a communication interface configured to transmit the spectral frequency distribution profile by a data link to a server, at which server a matching unit derives an identification of a type or class of one or more utility lines by comparing the spectral frequency distribution profile to a database of known frequency signatures of a plurality of known utility lines for generating the utility line identification information, and configured to receive the utility line identification information from the server;

an electronic signal evaluation unit at the device built for deriving the location information according to a difference in the electrical signals from the at least two magnetic detector units; and a visualisation unit built for charting the one or more utility lines with the utility line location information and providing the utility line identification information, wherein the electronic signal evaluation unit comprises a calibration unit providing a self-calibration of the detector units, with a calibration signal generator for applying an electrical calibration signal at one of the detector units or portions thereof.

18. The mobile detection device according to claim 17, wherein:

the utility line identification information comprises the known frequency signatures of the identified known utility lines, and the electronic signal evaluation unit is deriving the location information based on the utility line identification information with a filtering of the broadband electrical detection signal according to those frequency signatures of the identified known utility lines.

* * * * *

UNITED STATES PATENT AND TRADEMARK OFFICE
CERTIFICATE OF CORRECTION

PATENT NO. : 10,712,467 B2
APPLICATION NO. : 15/834848
DATED : July 14, 2020
INVENTOR(S) : Vohra et al.

Page 1 of 1

It is certified that error appears in the above-identified patent and that said Letters Patent is hereby corrected as shown below:

On the Title Page

In Column 1, insert Item:
-- (30) Foreign Application Priority Data
Dec. 21, 2016 (EP) ............ 16206012.3 --, therefor.

Signed and Sealed this
Tenth Day of November, 2020

Andrei Iancu
*Director of the United States Patent and Trademark Office*